United States Patent
Sajadi et al.

(10) Patent No.: US 11,858,039 B2
(45) Date of Patent: Jan. 2, 2024

(54) DIRECT INK PRINTING OF MULTI-MATERIAL COMPOSITE STRUCTURES

(71) Applicants: Saudi Arabian Oil Company, Dhahran (SA); William Marsh Rice University, Houston, TX (US)

(72) Inventors: Seyed Mohammad Sajadi, Houston, TX (US); Peter Boul, Houston, TX (US); Chandra Sekhar Tiwary, Houston, TX (US); Muhammad M. Rahman, Houston, TX (US); Pulickel M. Ajayan, Houston, TX (US); Carl Thaemltiz, Houston, TX (US)

(73) Assignees: Saudi Arabian Oil Company, Dhahran (SA); William Marsh Rice University, Houston, TX (US)

( * ) Notice: Subject to any disclaimer, the term of this patent is extended or adjusted under 35 U.S.C. 154(b) by 16 days.

(21) Appl. No.: 17/575,177

(22) Filed: Jan. 13, 2022

(65) Prior Publication Data
US 2023/0219138 A1 Jul. 13, 2023

(51) Int. Cl.
*B22F 10/18* (2021.01)
*B22F 12/58* (2021.01)
(Continued)

(52) U.S. Cl.
CPC .............. *B22F 10/18* (2021.01); *B22F 1/103* (2022.01); *B22F 12/53* (2021.01); *B22F 12/55* (2021.01);
(Continued)

(58) Field of Classification Search
CPC ...... B22F 10/18; B22F 1/103; B22F 2301/10; B22F 2302/40; B33Y 10/00; B33Y 40/10; B33Y 70/10
See application file for complete search history.

(56) References Cited

U.S. PATENT DOCUMENTS

| 1,811,799 A | 6/1931 | Lukens |
| 2,705,050 A | 3/1955 | Davis et al. |

(Continued)

FOREIGN PATENT DOCUMENTS

| BR | 102018014722 | 4/2020 |
| CN | 104204035 | 12/2014 |

(Continued)

OTHER PUBLICATIONS

Jennifer A. Lewis, et.al.[Direct Ink Writing of Three-Dimensional Ceramic Structures, J. Am. Ceram. Soc., 89 [12] 3599-3609 (2006)] (Year: 2006).*

(Continued)

*Primary Examiner* — Brian D Walck
*Assistant Examiner* — Nazmun Nahar Shams
(74) *Attorney, Agent, or Firm* — Fish & Richardson P.C.

(57) ABSTRACT

Methods for fabricating a multi-material composite structure are described. Methods for fabricating a multi-material composite structure include forming a first colloidal ink solution with a first material matrix, water, and a rheology modifying agent; forming a second colloidal ink solution with a second material matrix, water, and a rheology modifying agent; printing a first layer on a substrate using a first printing nozzle carrying the first colloidal ink solution; printing a second layer on top of the first layer using a second printing nozzle carrying the second colloidal ink solution; forming a 3D structure by printing a plurality of layers including the first layer and the second layer printed in an alternating pattern; and sintering the 3D structure to form the multi-material composite structure.

16 Claims, 17 Drawing Sheets

(51) Int. Cl.
*B22F 12/55* (2021.01)
*B22F 12/53* (2021.01)
*B22F 1/103* (2022.01)
*B33Y 40/10* (2020.01)
*B33Y 70/10* (2020.01)
*B33Y 10/00* (2015.01)

(52) U.S. Cl.
CPC ............. *B22F 12/58* (2021.01); *B33Y 10/00* (2014.12); *B33Y 40/10* (2020.01); *B33Y 70/10* (2020.01); *B22F 2301/10* (2013.01); *B22F 2301/35* (2013.01); *B22F 2302/40* (2013.01); *B22F 2998/00* (2013.01)

(56) References Cited

U.S. PATENT DOCUMENTS

| | | |
|---|---|---|
| 3,301,797 A | 1/1967 | Drucket et al. |
| 3,481,903 A | 12/1969 | Alelio |
| 3,887,009 A | 6/1975 | Miller et al. |
| 3,938,594 A | 2/1976 | Rhudy et al. |
| 4,137,182 A | 1/1979 | Golinkin |
| 4,272,430 A | 6/1981 | Pieh et al. |
| 4,615,809 A | 10/1986 | King |
| 4,771,112 A | 9/1988 | Engelbrecht |
| 4,797,433 A | 1/1989 | Lahalih |
| 4,883,126 A | 11/1989 | Leland |
| 5,007,481 A | 4/1991 | Williams et al. |
| 5,062,897 A | 11/1991 | Katsunnata |
| 5,159,828 A | 11/1992 | Steiger |
| 5,352,290 A | 10/1994 | Takeshita et al. |
| 5,401,312 A | 3/1995 | Hanst |
| 5,645,637 A | 7/1997 | Yaniv |
| 5,891,983 A | 4/1999 | Albrecht |
| 6,089,318 A | 7/2000 | Laramay et al. |
| 6,324,916 B1 | 12/2001 | Jessop |
| 6,609,067 B2 | 8/2003 | Tare |
| 6,664,215 B1 | 12/2003 | Tomlinson |
| 6,668,927 B1 | 12/2003 | Chatterji et al. |
| 6,828,378 B2 | 12/2004 | Okumura et al. |
| 6,844,852 B1 | 1/2005 | Simons |
| 7,077,199 B2 | 7/2006 | Vinegar et al. |
| 7,497,258 B2 | 3/2009 | Savery et al. |
| 7,523,784 B2 | 4/2009 | Lewis et al. |
| 7,525,872 B2 | 4/2009 | Tang et al. |
| 7,527,098 B2 | 5/2009 | Santra et al. |
| 7,555,414 B2 | 6/2009 | Calhoun |
| 7,612,142 B2 | 11/2009 | Ito et al. |
| 7,622,527 B2 | 11/2009 | Ito et al. |
| 7,637,319 B2 | 12/2009 | Savery et al. |
| 7,654,326 B1 | 2/2010 | Santra et al. |
| 7,773,454 B2 | 8/2010 | Barolak et al. |
| 7,787,327 B2 | 8/2010 | Tang et al. |
| 7,799,867 B2 | 9/2010 | Ito et al. |
| 7,833,344 B2 | 11/2010 | Santra et al. |
| 7,847,049 B2 | 12/2010 | Ito et al. |
| 7,893,011 B2 | 2/2011 | Lewis et al. |
| 7,893,168 B2 | 2/2011 | Ito et al. |
| 7,943,718 B2 | 5/2011 | Ito et al. |
| 7,981,943 B2 | 7/2011 | Ito et al. |
| 8,007,911 B2 | 8/2011 | Ito et al. |
| 8,017,688 B2 | 9/2011 | Ito et al. |
| 8,124,569 B2 | 2/2012 | Khan et al. |
| 8,142,562 B2 | 3/2012 | Klettke et al. |
| 8,309,498 B2 | 11/2012 | Funkhouser et al. |
| 8,382,476 B2 | 2/2013 | Schulte et al. |
| 8,418,763 B1 | 4/2013 | Deen et al. |
| 8,450,252 B2 | 5/2013 | Funkhouser et al. |
| 8,450,415 B2 | 5/2013 | Ito et al. |
| 8,580,906 B2 | 11/2013 | Hayashi et al. |
| 8,587,493 B2 | 11/2013 | Dickey et al. |
| 8,620,636 B2 | 12/2013 | Zhan et al. |
| 8,673,364 B2 | 3/2014 | Jalota et al. |
| 8,770,038 B2 | 7/2014 | Secq |
| 8,899,331 B2 | 12/2014 | Burnham |
| 9,023,150 B2 | 5/2015 | Brenneis et al. |
| 9,068,051 B2 | 6/2015 | Yamasaki et al. |
| 9,085,487 B2 | 7/2015 | Silva et al. |
| 9,163,499 B2 | 10/2015 | Adams et al. |
| 9,228,993 B2 | 1/2016 | Shine et al. |
| 9,266,972 B2 | 2/2016 | Yamasaki et al. |
| 9,375,699 B2 | 6/2016 | Ladet |
| 9,428,682 B2 | 8/2016 | Muthusamy et al. |
| 9,617,460 B2 | 4/2017 | Reddy |
| 9,708,869 B2 | 7/2017 | Sarmah |
| 10,009,994 B2 | 6/2018 | Sawada et al. |
| 10,048,336 B2 | 8/2018 | Hakimuddin |
| 10,060,242 B2 | 8/2018 | Benoit et al. |
| 10,150,905 B1 | 12/2018 | Reddy |
| 10,351,758 B2 | 7/2019 | Hull et al. |
| 10,647,909 B2 | 5/2020 | Li et al. |
| 10,836,950 B1 | 11/2020 | Patel et al. |
| 10,871,061 B2 | 12/2020 | Hull et al. |
| 10,913,683 B2 | 2/2021 | Rahman et al. |
| 10,966,317 B2 | 3/2021 | Abe et al. |
| 11,078,406 B2 | 8/2021 | Hull et al. |
| 11,130,900 B2 | 9/2021 | Patel et al. |
| 11,230,497 B2 | 1/2022 | Patel et al. |
| 2003/0138398 A1 | 7/2003 | Okumura et al. |
| 2006/0048671 A1 | 3/2006 | Ong |
| 2008/0006410 A1 | 1/2008 | Looney et al. |
| 2008/0156225 A1 | 7/2008 | Bury |
| 2008/0287633 A1 | 11/2008 | Drumheller |
| 2009/0030108 A1 | 1/2009 | Ito et al. |
| 2009/0214871 A1 | 8/2009 | Fukuda et al. |
| 2009/0312491 A1 | 12/2009 | Ito et al. |
| 2009/0312492 A1 | 12/2009 | Ruslim et al. |
| 2010/0006288 A1 | 1/2010 | Santra et al. |
| 2012/0006551 A1 | 1/2012 | Carman et al. |
| 2012/0322695 A1 | 12/2012 | Kefi et al. |
| 2013/0118740 A1 | 5/2013 | Sherman et al. |
| 2014/0096964 A1 | 4/2014 | Chakraborty et al. |
| 2014/0342531 A1 | 11/2014 | Tominaga et al. |
| 2015/0024122 A1 | 1/2015 | Wu et al. |
| 2015/0033719 A1 | 2/2015 | Lawrence et al. |
| 2015/0057196 A1 | 2/2015 | Debord et al. |
| 2015/0061669 A1 | 3/2015 | Hakimuddin |
| 2015/0152724 A1 | 6/2015 | Amendt et al. |
| 2015/0198008 A1 | 7/2015 | Smith et al. |
| 2016/0102238 A1 | 4/2016 | Muthusamy et al. |
| 2016/0177655 A1 | 6/2016 | Fripp |
| 2016/0264813 A1 | 9/2016 | Sawada et al. |
| 2017/0066959 A1 | 3/2017 | Hull et al. |
| 2017/0218248 A1 | 8/2017 | Boul et al. |
| 2017/0369761 A1 | 12/2017 | Jones et al. |
| 2018/0045870 A1 | 2/2018 | Asahi et al. |
| 2018/0215988 A1 | 8/2018 | Gamwell et al. |
| 2018/0251649 A1* | 9/2018 | Lewis .................. C09D 11/101 |
| 2018/0335494 A1 | 11/2018 | Hakimuddin |
| 2019/0054536 A1 | 2/2019 | Xu et al. |
| 2019/0077071 A1 | 3/2019 | Ware et al. |
| 2019/0144569 A1 | 5/2019 | Ke et al. |
| 2019/0211658 A1 | 7/2019 | Hull et al. |
| 2019/0310396 A1 | 10/2019 | Matsumoto et al. |
| 2020/0277441 A1 | 9/2020 | Stoddart et al. |
| 2020/0308341 A1 | 10/2020 | Yan et al. |
| 2020/0325070 A1 | 10/2020 | Patel et al. |
| 2021/0024806 A1 | 1/2021 | Patel et al. |
| 2021/0024808 A1 | 1/2021 | Schipper et al. |
| 2021/0024814 A1 | 1/2021 | Schipper et al. |
| 2021/0087419 A1 | 3/2021 | Zhu et al. |
| 2021/0101833 A1 | 4/2021 | Thaemlitz et al. |
| 2021/0102112 A1 | 4/2021 | Patel |
| 2021/0130676 A1 | 5/2021 | Patel et al. |
| 2021/0198558 A1 | 7/2021 | Hull et al. |
| 2021/0198559 A1 | 7/2021 | Hull et al. |
| 2021/0222055 A1 | 7/2021 | Schipper et al. |
| 2021/0302292 A1 | 9/2021 | Boul et al. |
| 2021/0379655 A1* | 12/2021 | Ren ........................ B22F 9/24 |

FOREIGN PATENT DOCUMENTS

| | | |
|---|---|---|
| CN | 107522436 | 12/2017 |
| CN | 109133754 | 1/2019 |

(56) References Cited

FOREIGN PATENT DOCUMENTS

| CN | 112456870 | 3/2021 |
|---|---|---|
| EP | 0383348 | 8/1990 |
| EP | 2820413 | 1/2015 |
| EP | 3060909 | 8/2016 |
| JP | H 10158045 | 6/1998 |
| JP | 2016088878 | 5/2016 |
| JP | 6647751 | 2/2020 |
| WO | WO 2016053319 | 4/2016 |
| WO | WO 2016080674 | 5/2016 |
| WO | WO 2019090140 | 5/2019 |
| WO | WO 2019147559 | 8/2019 |

OTHER PUBLICATIONS

Hossein Ravanbakhsh et al. [Composite Inks for Extrusion Printing of Biological and Biomedical Constructs, ACS Biomater. Sci. Eng. 2021, 7, 4009-4026]. (Year: 2021).*
Brian Elder, et al. ["Nanomaterial Patterning in 3D Printing", Adv. Mater. 2020, 32, 1907142]. (Year: 2020).*
Mojtaba Falahati, et al. ["Smart polymers and nanocomposites for 3D and 4D printing", Materials Today d vol. 40 d Nov. 2020, 215-245]. (Year: 2020).*
Jan Kohler et al. ["Mixing of Commercially Available 3D Printing Filaments for Novel RF Components," 2020 International Conference on Software, Telecommunications and Computer Networks (SoftCOM), Split, Croatia, 2020, pp. 1-6]. (Year: 2020).*
Zengrong Hu et al. [Laser additive manufacturing bulk graphene-copper nanocomposites, Nanotechnology 28 (2017) 445705 (9pp) (Year: 2017).*
Chao Xu, "Multi-Material Direct Ink Writing (DIW) for Complex 3D Metallic Structures with Removable Supports", ACS Appl. Mater. Interfaces 2019, 11, 8499-8506 (Year: 2019).*
Chao Xu, "Multi-Material Direct Ink Writing (DIW) for Complex 3D Metallic Structures with Removable Supports", ACS Appl. Mater. Interfaces 2019, 11, 8499-8506 (Year: 2019) (Year: 2019).*
U.S. Appl. No. 16/393,016, filed Apr. 24, 2019, Hakimuddin et al.
U.S. Appl. No. 16/593,820, filed Oct. 4, 2019, Patel et al.
U.S. Appl. No. 16/668,730, filed Oct. 30, 2019, Patel et al.
U.S. Appl. No. 17/107,428, filed Nov. 30, 2020, Hull et al.
U.S. Appl. No. 17/196,273, filed Mar. 9, 2021, Santra et al.
U.S. Appl. No. 17/550,631, filed Dec. 14, 2021, Patel et al.
U.S. Appl. No. 17/550,638, filed Dec. 14, 2021, Patel et al.
U.S. Appl. No. 17/551,051, filed Dec. 14, 2021, Patel et al.
U.S. Appl. No. 63/289,308, filed Dec. 14, 2021, Hull et al.
Acquah et al., "Carbon Nanotubes and Graphene as Additives in 3D Printing," Carbon Nanotubes—Current Progress of Their Polymer Composites, InTech, 2016, 26 pages.
Adhikary et al., "Effects of carbon nanotubes on expanded glass and silica aerogel based lightweight concrete," Nature, Scientific Reports, Jan. 2021, 11:2104, 11 pages.
Agartan et al., "CO2 storage in depleted oil and gas fields in the Gulf of Mexico." International Journal of Greenhouse Gas Control 72, May 2018, 38-48, 11 pages.
Andrew, "Global CO2 emissions from cement production," Earth Syst. Sci. Data, Jan. 2018, 10:195-217, 23 pages.
API, "10B-2, Recommended Practice for Testing Well Cements," American Petroleum Institute, Apr. 2019, 1-124, RP 10B-2, 124 pages.
Arbad et al., "A Review of Recent Research on Contamination of Oil Well Cement with Oil-Based Drilling Fluid and the Need of New and Accurate Correlations," ChemEngineering, Apr. 2020, 20 pages.
Arts et al., "Seismic monitoring at the Sleipner underground CO2 storage site (North Sea)," in Baines et al., Geologic Storage of Carbon Dioxide. London: Geologic Society Special Publications, Jan. 2004, 11 pages.
Ashik et al., "A review on methane transformation to hydrogen and nanocarbon: Relevance of catalyst characteristics and experimental parameters on yield," Renewable and Sustainable Energy Reviews, Sep. 2017, 76:743-767, 25 pages.
Asmi.jp [online], "SeRM Series Products List," asmi.jp, Advanced Softmaterials Inc., retrieved from URL <www.asmi.jp/en/product#sec_03>, retrieved on Aug. 15, 2019, available on or before Jan. 2013 (via wayback machine URL <https://web.archive.org/web/20130315000000*/www.asmi.jp/en/product>), 5 pages.
Bagheri et al., "Rubber-toughened epoxies: a critical review." Journal of Macromolecular Science®, Part C: Polymer Reviews 49.3, Aug. 2009, 201-225, 25 pages.
Bett, Geothermal Well Cementing, Materials and Placement Techniques, 2010, 32 pages.
Beyer, Daniel. "Evolution of reservoir properties in the Lower Triassic aquifer sandstones of the Thuringian Syncline in Central Germany" Diss., 2015, 221 pages.
Bouzalakos et al., "Overview of carbon dioxide (CO2) capture and storage technology" Developments and Innovation in Carbon Dioxide (CO2) Capture and Storage Technology, Jan. 2010, 24 pages.
Brichni et al., "Optimisation of Magnesium Oxychloride Cement Properties by Silica Glass," Adv. Cem. Res., Jul. 2016, 28:10, 654-663, 10 pages.
Buchanan et al., "Metal 3D printing in construction: A review of methods, research, applications, opportunities and challenges," Engineering Structures, Feb. 2019, 180:332-348, 36 pages.
Cao et al., "Study of the in-situ growth of carbon nanofibers on cement clinker," Mater. Res. Express, May 2020, 7:5 (055306), 10 pages.
Capper et al., "Internal antiplasticisation in highly crosslinked amine cured multifunctional epoxy resins," Polymer, 2018, 146:321-330, 11 pages.
Carey et al., "Fracture-permeability behavior of shale," Journal of unconventional oil and gas resources, Sep. 2015, 11, 53 pages.
Ceglar et al., "Deepwater outcrop analogue study: basal Bunkers Sandstone, Donkey Bore Syncline, Northern Flinders Ranges, Australia" PESA Eastern Australia Basins Symposium II. Adelaide, 2004, 11 pages.
Chambers et al., "Liquid crystal elastomer-nanoparticle systems for actuation," Journal of Materials Chemistry, 2009, 19.11:1524-1531, 7 pages.
Chatham et al., "A review of the process physics and material screening methods for polymer powder bed fusion additive manufacturing," Progress in Polymer Science, Jun. 2019, 93:68-95, 28 pages.
Chen et al., "Enhancement of mechanical and wear resistance performance in hBN reinforced epoxy nanocomposites," Polym. Int., 2017, 66: 659, 25 pages.
Chen et al., "Rapid control of phase growth by nanoparticles," Nature communications, May 2014, 5.1, 9 pages.
Cho et al., "Cell-Encapsulating Hydrogel Puzzle: Polyrotaxane-Based Self-Healing Hydrogels," Chem. Eur. J., 2019, 26:4 (913-920), 22 pages.
Choi et al., "Highly elastic binders integrating polyrotaxanes for silicon microparticle anodes in lithium ion batteries." Science 357.6348, Jul. 2017, 279-283, 5 pages.
Cordero et al., "Strengthening of ferrous binder jet 3D printed components through bronze infiltration," Additive Manufacturing, May 2017, 15:87-92, 6 pages.
Cui et al., "Electrical and mechanical properties of electrically conductive adhesives from epoxy, micro-silver flakes, and nano-hexagonal boron nitride particles after humid and thermal aging," International Journal of Adhesion and Adhesives, Jul. 2013, 44:232-236, 5 pages.
Davidson et al., "3D Printable and Reconfigurable Liquid Crystal Elastomers with Light-Induced Shape Memory via Dynamic Bond Exchange," Advanced Materials, Jan. 2020, 6 pages.
DebRoy et al., "Additive manufacturing of metallic components—process, structure and properties," Progress in Materials Science, Mar. 2018, 92:112-224, 114 pages.
DebRoy et al., "Scientific, technological and economic issues in metal printing and their solutions," Nature Materials, Jul. 2019, 18, 7 pages.

(56) References Cited

OTHER PUBLICATIONS

Dowling et al., "A review of critical repeatability and reproducibility issues in powder bed fusion," Materials & Design, Jan. 2020, 186, 18 pages.
Eiken et al., "Lessons learned from 14 years of CCS operations: Sleipner, In Salah and Snøhvit." Energy procedia 4, Jan. 2011, 5541-5548, 8 pages.
El-Wardany et al., "Challenges in three-dimensional printing of high-conductivity copper," Journal of Electronic Packaging, Jun. 2018, 140.2:020907, 12 pages.
Enayatpour et al., "Advanced Modeling of Cement Displacement Complexities" SPE/IADC-184702-MS, SPE/IADC Drill Conference and Exhibition, Mar. 2017, 21 pages.
Fayazfar et al., "A critical review of powder-based additive manufacturing of ferrous alloys: Process parameters, microstructure and mechanical properties," Materials & Design, Apr. 2018, 144:98-128, 31 pages.
Foldyna et al., "Dispersion of carbon nanotubes for application in cement composites," Science Direct, Procedia Engineering, 2016, 149:94-99, 6 pages.
Funkhouser and Norman, "Synthetic Polymer Fracturing Fluid for High-Temperature Application," SPE 80236, Society of Petroleum Engineers (SPE), International Symposium on Oilfield Chemistry, Feb. 5-7, 2003, 6 pages.
Gaillard et al., "Novel Associative Acrylamide-based Polymers for Proppant Transport in Hydraulic Fracturing Fluids," SPE 164072, Society of Petroleum Engineers (SPE), SPE International Symposium on Oilfield Chemistry, Apr. 8-10, 2013, 11 pages.
Gelebart et al., "Photoresponsive fiber array: toward mimicking the collective motion of cilia for transport applications," Advanced Functional Materials, Aug. 2016, 26.29:5322-5327, 6 pages.
Genedy et al., "Examining epoxy-based nanocomposites in wellbore seal repair for effective $CO_2$ sequestration," Energy Procedia, Jan. 2014, 63:5798-5807, 10 pages.
Gislason et al., "Carbon storage in basalt." Science 344.6182, Apr. 2014, 373-374, 2 pages.
Gladman et al., "Biomimetic 4D printing," Nature materials, Apr. 2016, 15.4:413-418, 7 pages.
Global Status of CCS Report, Dec. 11, 2020, Global CCS Institute, 44 pages.
Goeppert et al., "Air as the renewable carbon source of the future: an overview of $CO_2$ capture from the atmosphere," Energy Environ. Sci., 2012, 5: 7833, 12 pages.
Gojny et al., "Carbon nanotube-reinforced epoxy-composites: enhanced stiffness and fracture toughness at low nanotube content," Compos. Sci. Technol., 2004, 64:2363-2371, 9 pages.
Gong et al., "Analysis of defect generation in Ti—6Al-4V parts made using powder bed fusion additive manufacturing processes," Additive Manufacturing, Oct. 2014, 1, 60 pages.
Gorsse et al., "Additive manufacturing of metals: a brief review of the characteristic microstructures and properties of steels, Ti—6Al-4V and high-entropy alloys," Science and Technology of advanced Materials, Dec. 2017, 18.1:584-610, 28 pages.
Guo et al., "Shape memory epoxy composites with high mechanical performance manufactured by multi-material direct ink writing," Compos. Part A Appl. Sci. Manuf., 2020, 135: 105903, 8 pages.
Gupta and Carman, "Fracturing Fluid for Extreme Temperature Conditions is Just as Easy as the Rest," SPE 140176, Society of Petroleum Engineers (SPE), SPE Hydraulic Fracturing Technology Conference, Jan. 24-26, 2011, 5 pages.
Hannis et al., "$CO_2$ Storage in Depleted or Depleting Oil and Gas Fields: What can We Learn from Existing Projects?" Energy Procedia, 2017, 114, 5680-5690, 11 pages.
Harada et al., "Preparation and properties of inclusion complexes of polyethylene glycol with .alpha.-cyclodextrin," Macromolecules, 1993, 26:5698-5703, 6 pages.
Harada et al., "Supramolecular polymeric materials via cyclodextrin-guest interactions." Accounts of chemical research 47.7, Jul. 2014, 2128-2140, 13 pages.

Hart et al., "Material properties and applications of mechanically interlocked polymers," Nat. Rev. Mater., 2021, 6:6 (508-530), 23 pages.
Hepburn et al., "The technological and economic prospects for $CO_2$ utilization and removal," Nature, Nov. 2019, 575, 11 pages.
Herzog et al., "Additive Manufacturing of Metals," Acta Mater. 2016, 117:371-392, 22 pages.
Hitzler et al., "In-plane anisotropy of selective laser-melted stainless steel: The importance of the rotation angle increment and the limitation window," Proceedings of the Institution of Mechanical Engineers, Part L: Journal of Materials: Design and Applications, Jul. 2019, 233.7:1419-1428, 10 pages.
Hojjatzadeh et al., "Direct observation of pore formation mechanisms during LPBF additive manufacturing process and high energy density laser welding," International Journal of Machine Tools and Manufacture 153:103555, Jun. 2020, 32 pages.
Houben et al., "Plasticization behavior of crown-ether containing polyimide membranes for the separation of $CO_2$," Separation and Purification Technology, 2021, 255:117307, 10 pages.
Hoyos-Palacio et al., "Catalytic effect of Fe, Ni, Co and Mo on the CNTs production," IOP Conference Series: Materials Science and Engineering, 2014, 59:012005, 9 pages.
Huang et al., "Finite element analysis of thermal behavior of metal powder during selective laser melting," International Journal of Thermal Sciences, Jun. 2016, 104:146-157, 12 pages.
Hull et al., "Chemomechanical Effects of Oxidizer-$CO_2$ Systems Upon Hydraulically Fractured Unconventional Source Rock," Canadian Journal of Chemical Engineering, 2021, 26 pages.
Hull et al., "Oxidative Kerogen Degradation: A Potential Approach to Hydraulic Fracturing in Unconventionals," Energy Fuels, 2019, 33: 4758-4766, 8 pages.
Hull et al., "Synthesis and structural characterization of $CO_2$-soluble oxidizers [Bu4N]BrO3 and [Bu4N]ClO3 and their dissolution in cosolvent-modified $CO_2$ for reservoir applications," RSC Advances, Royal Society of Chemistry, Dec. 21, 2020, 10: 44973, 8 pages.
Hur et al., "Reactive force fields for modeling oxidative degradation of organic matter in geological formations," RSC Adv. 2021, 11:29298-29307, 23 pages.
Isaka et al., "Influence of long-term operation of supercritical carbon dioxide based enhanced geothermal system on mineralogical and microstructurally-induced mechanical alteration of surrounding rock mass," Renewable Energy, Jun. 2019, 136, 14 pages.
Isfahani et al., "Dispersion of multi-walled carbon nanotubes and its effects on the properties of cement composites," Cement and Concrete Composites, Nov. 2016, 74:154-163, 10 pages.
Isobe et al., "Thermally dissociable pseudo-polyrotaxane as a supramolecular shrinkage suppressor for epoxy-amine curing system." Journal of Polymer Science Part A: Polymer Chemistry 46.6, Mar. 2008, 2305-2308, 4 pages.
Jafariesfad et al., "Cement Sheath Modification Using Nanomaterials for Long-term Zonal Isolation of Oil Wells: Review" Journal of Petroleum Science and Engineering., 156, 2017, 662-672, 28 pages.
Jiang et al., "Highly Stretchable and Instantly Recoverable Slide-Ring Gels Consisting of Enzymatically Synthesized Polyrotaxane with Low Host Coverage," Chem. Mater., 2018, 30:15 (5013), 10 pages.
Jin et al., "Synthesis and application of epoxy resins: A review." Journal of Industrial and Engineering Chemistry 29, Sep. 2015, 11 pages.
Kato et al., "Organic-Inorganic Hybrid Slide-Ring Gels: Polyrotaxanes Consisting of Poly(dimethylsiloxane) and γ-Cyclodextrin and Subsequent Topological Cross-Linking" Macromolecules 42, 18, Aug. 2009, 7129-7136, 8 pages.
Khuenkaew et al., "Resistance spot welding of SUS316L austenitic/SUS425 ferritic stainless steels: weldment characteristics, mechanical properties, phase transformation and solidification," Metals, Jun. 2019, 9.6, 17 pages.
Kim et al., "Development of $CO_2$-Selective Polyimide-Based Gas Separation Membranes Using Crown Ether and Polydimethylsiloxane," Polymers, 2021, 13:1927, 15 pages.

(56) References Cited

OTHER PUBLICATIONS

Koyanagi et al., "Movable cross-linked polymeric materials from bulk polymerization of reactive polyrotaxane cross-linker with acrylate monomers." Macromolecules 50.15, Aug. 2017, 5695-5700, 6 pages.

Kuo et al., "Bonding behavior of repair material using fly-ash/ground granulated blast furnace slag-based geopolymer," Materials, Jan. 2019, 12.10, 16 pages.

Ladva et al., "The Cement-to-Formation Interface in Zonal Isolation," IADC/SPE 88016, Society of Petroleum Engineers (SPE), presented at the IADC/SPE Asia Pacific Drilling Technology Conference and Exhibition in Kuala Lumpur, Malaysia, Sep. 13-15, 2004, 369-382, 14 pages.

Levenfeld et al., "Effect of residual carbon on the sintering process of M2 high speed steel parts obtained by a modified metal injection molding process," Metallurgical and Materials Transactions, Jun. 2002, A:33.6 (1843-1851), 9 pages.

Lewis et al., "Direct ink writing of three-dimensional ceramic structures," Journal of the American Ceramic Society, Dec. 2006, 89.12:3599-3609, 11 pages.

Li et al., "Contamination of Cement Slurries with Diesel-Based Drilling Fluids in a Shale Gas Well," J. Nat. Gas Sci. Eng., Aug. 2015, 27:1312-1320, 9 pages.

Li et al., "Residual stress in metal additive manufacturing," Procedia Cirp, Jan. 2018, 71:348-353, 6 pages.

Li et al., "Slide-ring shape memory polymers with movable cross-links," React. Funct. Polym., 2017, 119:26-36, 25 pages.

Li et al., "The pore-fracture system properties of coalbed methane reservoirs in the Panguan Syncline, Guizhou, China." Geoscience Frontiers, Nov. 2012, 3, 853-862, 10 pages.

Lin et al., "Rapid macroscale shape morphing of 3D-printed polyrotaxane monoliths amplified from pH-controlled nanoscale ring motions," J. Mater. Chem., 2018, C:6 (11956), 5 pages.

Lin et al., "Ring Shuttling Controls Macroscopic Motion in a Three-Dimensional Printed Polyrotaxane Monolith," Chem. Int. Ed., 2017, 56:4452-4457, 7 pages.

Liu et al., "A novel method to evaluate cement shale bond strength," SPE-173802-MS, Society of Petroleum Engineers (SPE), presented at the SPE International Symposium on Oilfield Chemistry, The Woodlands, Texas, Apr. 13-15, 2015, 20 pages.

Liu et al., "Graphene Lubricant," Applied Materials Today, 2020, 20:2020 (100662), 31 pages.

Loizzo et al., "Reusing O&G-Depleted Reservoirs for CO2 Storage: Pros and Cons" SPE Projects, Facilities & Construction, Sep. 2010, 5, 166-172, 10 pages.

Luo et al., "A survey of finite element analysis of temperature and thermal stress fields in powder bed fusion additive manufacturing," Additive Manufacturing, May 2018, 21:318-332, 15 pages.

Mather et al., "Michael addition reactions in macromolecular design for emerging technologies," Progress in Polymer Science, May 2006, 31.5:487-531, 45 pages.

Mayumi et al., "Structure and dynamics of polyrotaxane and slide-ring materials," Polymer, 2010, 51:959-967, 9 pages.

Metz et al., "The IPCC Special Report on Carbon Dioxide Capture and Storage" in Working Group III of the Intergovernmental Panel on Climate Change, Sep. 22-24, 2005, 33 pages.

Mikhalchan et al., "Aligned carbon nanotube-epoxy composites: the effect of nanotube organization on strength, stiffness, and toughness," J. Mater. Sci., 2016, 51:10005-10025, 21 pages.

Mostafaei et al., "Binder jet 3D printing—Process parameters, materials, properties, modeling, and challenges," Progress in Materials Science, Jun. 2021, 119:100707, 141 pages.

Nakahata et al., "Self-Healing Materials Formed by Cross-Linked Polyrotaxanes with Reversible Bonds," Chem, 2016, 1:5 (766-775), 11 pages.

Nelson and Guillot, Well Cementing 2nd Ed., Schlumberger, 2006, 807 pages.

Obayi et al., "Effect of grain sizes on mechanical properties and biodegradation behavior of pure iron for cardiovascular stent application," Biomatter, Jan. 2016, 6.1:e959874, 10 pages.

Ohm et al., "Liquid Crystalline Elastomers as Actuators and Sensors," Advanced Materials, Aug. 2010, 22: 3366-3387, 22 pages.

Oliveira et al., "Processing parameters in laser powder bed fusion metal additive manufacturing," Materials & Design, Aug. 2020, 193, 12 pages.

Opedal et al., "Experimental study on the cement-formation bonding," SPE 168138, Society of Petroleum Engineers (SPE), presented at the SPE International Symposium and Exhibition on Formation Damage Control,Lafayette, Louisiana, Feb. 26-28, 2014, 12 pages.

Pau et al., "High-resolution simulation and characterization of density-driven flow in CO2 storage in saline aquifers" Advances in Water Resources, 33, 443-455, Apr. 2010, 27 pages.

Payenberg et al., "Architecture of a deep-water, salt-withdrawal mini-basin, Donkey Bore Syncline, Australia," in Nilse et al., Atlas of Deep-Water Outcrops, Jan. 2008, 5 pages.

Peerzada et al., "Additive Manufacturing of Epoxy Resins: Materials, Methods, and Latest Trends," Ind. Eng. Chem. Res., 2020, 59:14, 52 pages.

Prabhakar et al., "Enhancing the Gel Transition Time and Right-Angle-Set Property of Oil Well Cement Slurries by Incorporating CSA Cement and Gypsum" IPTC-19224-MS, International Petroleum Technology Conference, Mar. 2019, 12 pages.

Prajapati et al., "Measurement of anisotropic thermal conductivity and inter-layer thermal contact resistance in polymer fused deposition modeling (FDM)," Additive Manufacturing, May 2018, 21:84-90, 7 pages.

Pruksawan et al., "Homogeneously Dispersed Polyrotaxane in Epoxy Adhesive and Its Improvement in the Fracture Toughness," Macromolecules, 2019, 52:2464-2475, 12 pages.

Radonjic and Oyibo, "Experimental evaluation of wellbore cement-formation shear bond strength in presence of drilling fluid contamination," International Conference on porous media and their applications in science, engineering and industry, Hawaii, Jun. 24, 2014, 7 pages.

Ramsdale-Capper et al., "Internal antiplasticisation in highly cross-linked amine cured multifunctional epoxy resins." Polymer 146, Jun. 2018, 321-330, 10 pages.

Reddy et al., "Relating Cement Additive Performanace to Mix Water Composition for Deep Water and Salt Zone Applications" SPE-180344-MS, Society of Petroleum Engineers, SPE Deepwater Drilling and Completions Conference 2016, Sep. 2016, 20 pages.

Rimdusit et al., "Shape memory polymers from benzoxazine-modified epoxy," Smart Mater. Struct., 2013, 22:075033, 13 pages.

Ringrose, "How to store CO2 underground: insights from early-mover CCS projects" Springer, 2020, 141 pages.

Roca et al., "Policy needed for additive manufacturing," Nature Materials, Aug. 2016, 15:8, 4 pages.

Saed et al., "Molecularly-engineered, 4D-Printed liquid crystal elastomer actuators," Advanced Functional Materials, 2019, 29.3, 9 pages.

Sajadi et al., "Direct ink writing of cement structures modified with nanoscale additive," Advanced Engineering Materials, Aug. 2019, 21.8:1801380, 10 pages.

Seo et al., "Development of a supramolecular accelerator simultaneously to increase the cross-linking density and ductility of an epoxy resin," Chem. Eng. J., 2019, 356:303-311, 30 pages.

Seo et al., "Enhanced Mechanical Strength, Flexibility, and Shape-Restoring Rate of a Drug-Eluting Shape-Memory Polymer by Incorporation of Supramolecular Cross-Linkers," ACS Macro Lett., 2020, 9, 389-395, 7 pages.

Simao et al., "Cementing Solutions for Salt- and CO2-Laden Presalt Zones" SPE-180336-MS, SPE Deepwater Drilling and Completions Conference Proceedings, Sep. 2016, 11 pages.

Singh et al., "Powder bed fusion process in additive manufacturing: An overview," Materials Today: Proceedings, Jan. 2020, 26:3058-3070, 13 pages.

Snow et al., "Invited Review Article: Review of the formation and impact of flaws in powder bed fusion additive manufacturing," Additive Manufacturing, Jul. 2020, 15 pages.

Soto et al., "Self-assembly of a supramolecular network with pseudo-rotaxane cross-linking nodes and its transformation into a mechanically locked structure by rotaxane formation," Chemical Communications, 2016, 52:14149, 5 pages.

(56) References Cited

OTHER PUBLICATIONS

Sun et al., "Short-aramid-fiber toughening of epoxy adhesive joint between carbon fiber composites and metal substrates with different surface morphology," Compos. Part B Eng., 2015, 77:38-45, 30 pages.

Tagliaferri et al., "Direct ink writing of energy materials," Materials Advances, 2021, 2.2:540-563, 24 pages.

Tao et al., "A Brief Review of Gas Migration in Oilwell Cement Slurries" Energies, 14, 2369, 2021, 22 pages.

Telschow et al., "Cement Formation—A Success Story in a Black Box: High Temperature Phase Formation of Portland Cement Clinker," Industrial & Enginering Chemistry Research (I&EC Research), American Chemical Society (ACS Publications), Jul. 2012, 51:34 (10983-11004), 22 pages.

Tong et al., "Committed Emissions from Existing Energy Infrastructure Jeopardize 1.5° C. Climate Target," Nature, 2019, 572:7769 (373-377), 17 pages.

Tran et al., "3D printing of highly pure copper," Metals, Jul. 2019, 9.7:756, 24 pages.

United States Enviornmental Protection Agency, "UIC Pressure Falloff Testing Guideline" EPA Region 6, Aug. 8, 2002, 29 pages.

Ürk et al., "Structure-controlled growth of vertically-aligned carbon nanotube forests using iron-nickel bimetallic catalysts," Materials Advances, 2021, 2:2021-2030, 10 pages.

Utela et al., "A review of process development steps for new material systems in three dimensional printing (3DP)," Journal of Manufacturing Processes, Jul. 2008, 10.2:96-104, 9 pages.

Vyavahare et al., "Fused deposition modelling: A review," Rapid Prototyping Journal, Jan. 2020, 26 pages.

Wang et al., "Molecular Simulation of CO2/CH4 Competitive Adsorption on Shale Kerogen for CO2 Sequestration and Enhanced Gas Recovery," J. Phys. Chem. C, 2018, 122:30 (17009-17018), 29 pages.

Wang et al., "Relaxation and Reinforcing Effects of Polyrotaxane in an Epoxy Resin Matrix," Macromolecules, 2006, 39:3 (1046-1052), 7 pages.

Weir et al., "Reservoir storage and containment of greenhouse gases" Energy Conversion and Management 36.6-9, Jun. 1995, 531-534, 4 pages.

Welch et al., "Shear strength and permeability of the cement-casing interface," International Journal of Greenhouse Gas Control, Apr. 2020, 95, 29 pages.

Wenz et al., "Cyclodextrin Rotaxanes and Polyrotaxanes" Chemistry Reviews 106, No. 3, 2006, 106, 782-817, 36 pages.

Wimpenny et al., "Advances in 3D printing & additive manufacturing technologies," Singapore: Springer, 2017, 195 pages.

Wu et al., "A Crown Ether-Containing Copolyimide Membrane with Improved Free Volume for CO2 Separation," Industrial & Engineering Chemical Research, 2019, 58:14357-14367, 44 pages.

Wu et al., "High-strain slide-ring shape-memory polycaprolactone-based polyurethane," Soft Matter, 2018, 14:4558, 28 pages.

Yakovlev et al., "Modification of Cement Matrix Using Carbon Nanotube Dispersions and Nanosilica," Science Direct, Procedia Engineering, Modern Building Materials, Structures and Techniques, MBMST 2016, 2017, 172:1261-1269, 9 pages.

Zhan et al., "In situ-grown carbon nanotubes enhanced cement-based materials with multifunctionality," Cement and Concrete Composites, Apr. 2020, 108:103518, 11 pages.

Zhang et al., "Dibenzo-21-crown-7-ether contained 6FDA-based polyimide membrane with improved gas selectivity," Separation and Purification Technology, 2021, 264:118454, 13 pages.

Zhang et al., "Three-Dimensional Printing of Continuous Flax Fiber-Reinforced Thermoplastic Composites by Five-Axis Machine," Materials, 2020, 13:1678, 11 pages.

Zoback, "Reservoir geomechanics," Cambridge University Press, 2010, 2 pages.

* cited by examiner

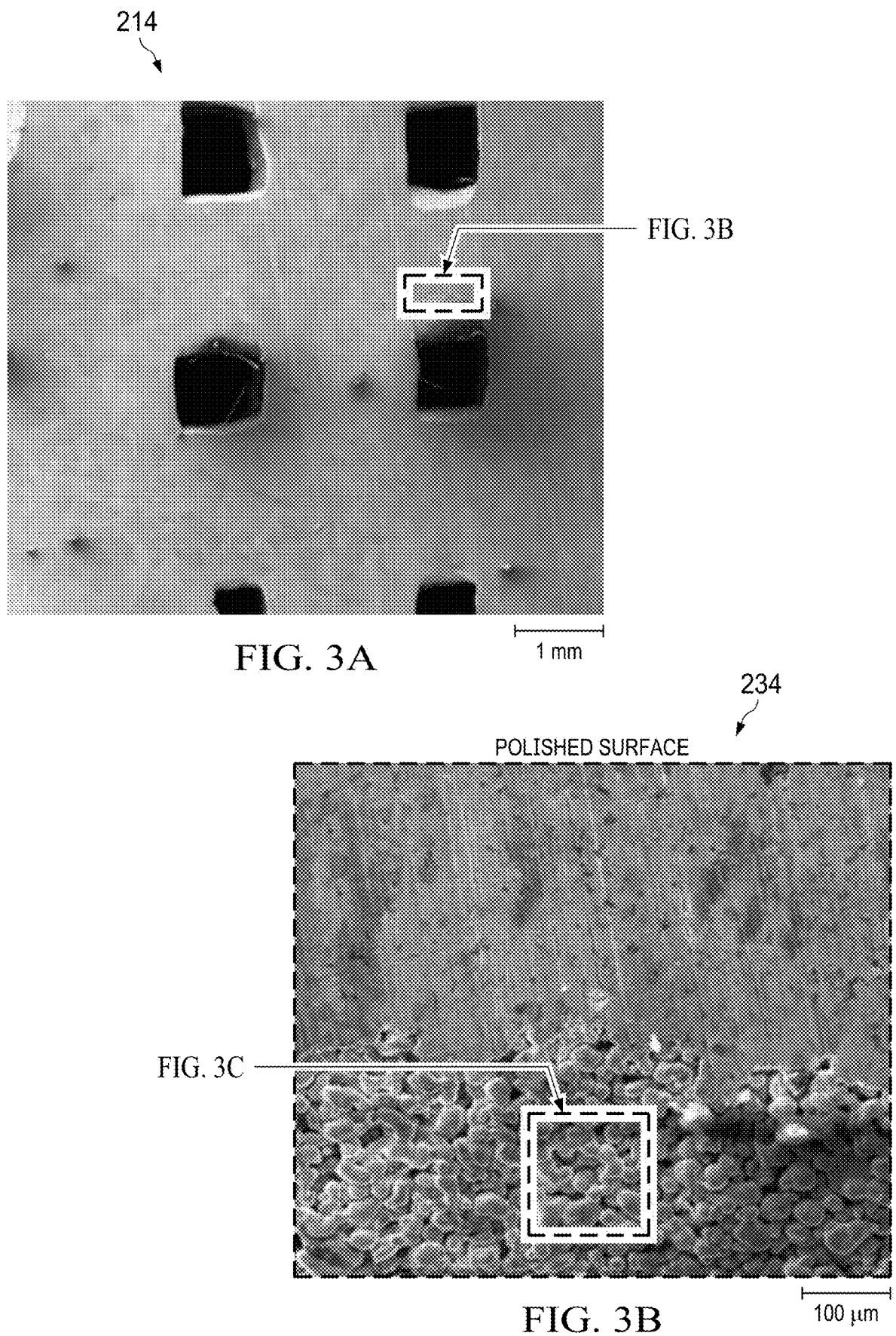

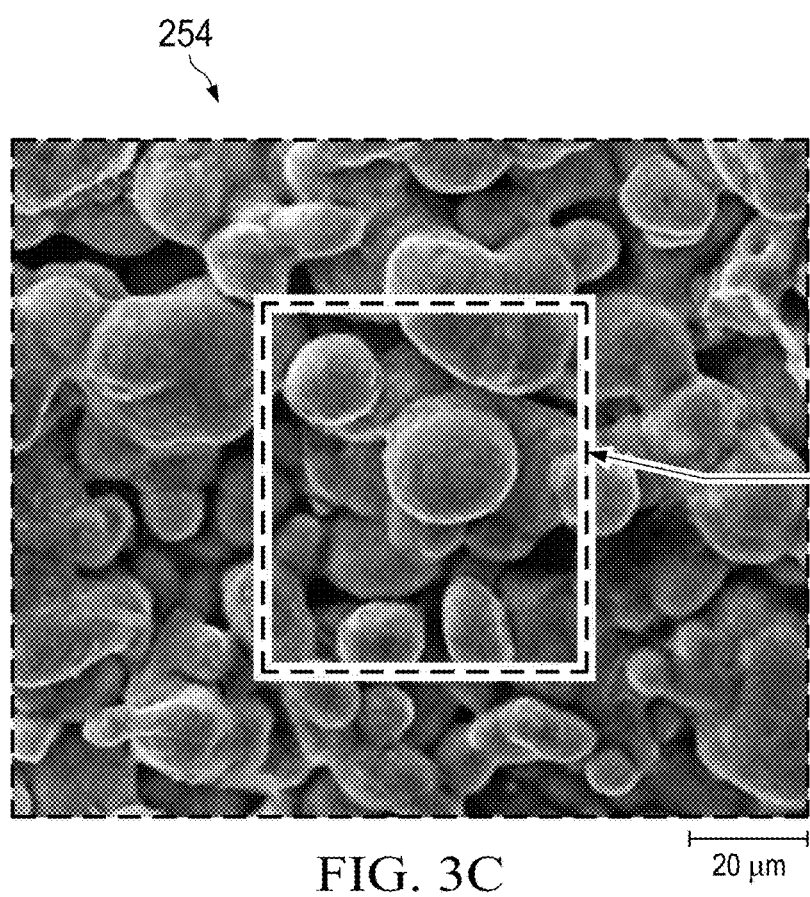
FIG. 3C   20 μm
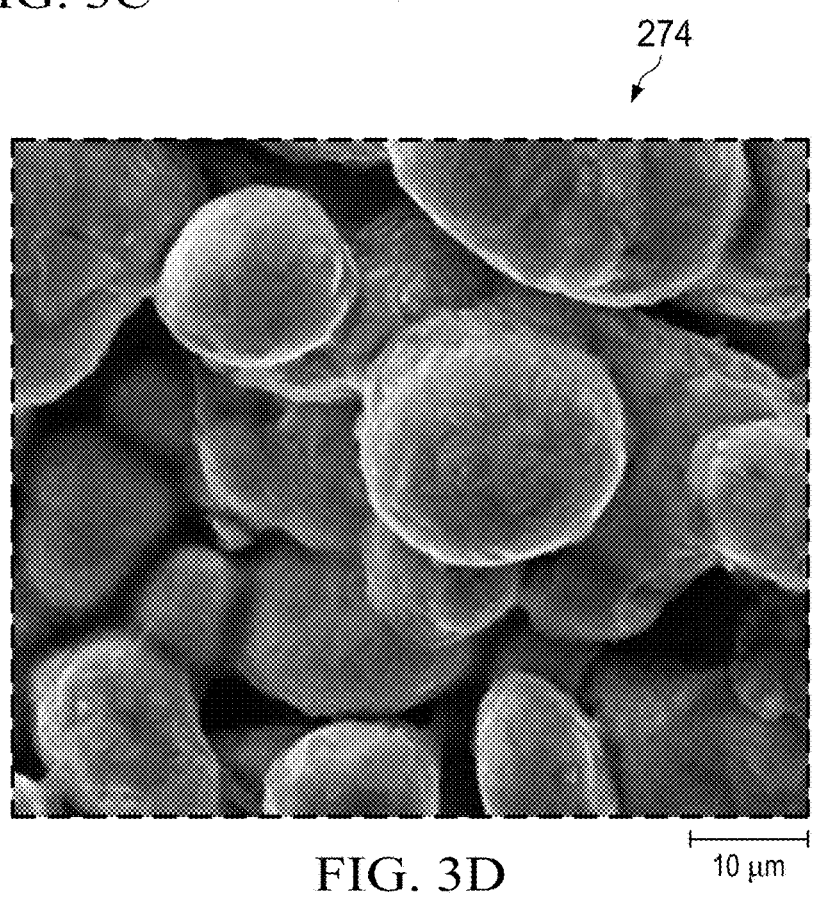
FIG. 3D   10 μm

654
BEFORE TEST 1 cm

674
FRONT 1 cm

694
BACK 1 cm

DIRECT INK PRINTING OF MULTI-MATERIAL COMPOSITE STRUCTURES

TECHNICAL FIELD

The present disclosure generally relates to methods and compositions for fabricating multi-material composite structures, more particularly methods for fabricating metal-ceramic composite structures using direct ink writing method.

BACKGROUND

Additive manufacturing (or 3D printing) techniques have been adapted in a variety of industries (e.g., medical, automotive, aerospace, oil and gas, or marine) due to their flexibility and adaptability to manufacture complex parts and customize components (e.g., medical implants) in moderate production volume.

The metal 3D printing process is a layer-by-layer fabrication technique that uses powder bed fusion techniques (PBF) to selectively melt and fuse the powder in each layer using heat or energy sources (e.g., laser or electron beam). The layer-by-layer deposition is repeated until the desired object is produced. Current printing methods (e.g., selective laser melting (SLM), selective electron beam melting (SEBM), direct laser fabrication (DLF), and laser metal deposition (LMD)) use a single material for printing of parts and vary the solidification growth rate and the local temperature gradient based on the processing parameters which directly affects the mechanical properties of the final printed metal part.

SUMMARY

This specification describes methods for fabricating multi-material composite structures using colloidal metal-based ink, formed from metal powder, and direct ink writing method. The colloidal metal ink includes rheological and viscoelastic properties (e.g., shear-thinning behavior, viscosity, storage modulus, or yield strength) for use with a direct ink writing (or printing) process to produce multi-material (e.g., metal-ceramic) composite parts with custom structural architecture at ambient conditions. The colloidal metal ink can include a silica-based binder. The silica-based binder can serve as an adhesive to hold the grains in the metal matrix of the printing powder under ambient conditions. In some implementations, the metal-ceramic composite structure includes a copper-graphene composite structure. In some implementations, the metal-ceramic composite structure includes a copper-iron composite structure.

The described approach forms a colloidal metal ink suitable for the direct ink printing process with a shear-thinning behavior and a desired apparent viscosity, which facilitates the extrusion of the ink through a printing nozzle without high printing pressure. In addition, the colloidal metal ink has appropriate viscoelastic properties (e.g., high storage modulus and yield strength) that allow the deposited ink layer to maintain its filamentary shape after extrusion from the printing nozzle. Using the direct ink writing process allows the printing process to be a separate step from the post-processing step (e.g., a fusion of metal powder by sintering) which enables the opportunity for 3D printing of multi-material metal parts.

In some aspects, a method for fabricating a multi-material composite structure includes forming a first colloidal ink solution with a first material matrix, water, and a rheology modifying agent; forming a second colloidal ink solution with a second material matrix, water, and a rheology modifying agent; printing a first layer on a substrate using a first printing nozzle carrying the first colloidal ink solution; printing a second layer on top of the first layer using a second printing nozzle carrying the second colloidal ink solution; forming a 3D structure by printing a plurality of layers with the first layer and the second layer printed in an alternating pattern; and sintering the 3D structure to form the multi-material composite structure.

Embodiments of the method for fabricating a multi-material composite structure can include one or more of the following features.

In some embodiments, the method includes forming the first colloidal ink solution by mixing a copper powder with a laponite binding agent and adding a mixture of the copper powder and the laponite binding agent to water. In some cases, forming the first colloidal ink solution includes mixing the mixture and the water using a mechanical mixer. In some cases, mixing the copper powder with the laponite binding agent includes mixing the copper powder with a layered synthetic nanoclay agent with a chemical formulation of $Si_8Mg_{5.45}Li_{0.4}O_{24}Na_{0.7}$.

In some embodiments, forming the second colloidal ink solution includes mixing an iron powder with a laponite binding agent and adding a mixture including the iron powder and the laponite binding agent to water. In some cases, forming the second colloidal ink solution includes mixing the mixture and the water using a mechanical mixer.

In some embodiments, forming the second colloidal ink solution includes mixing a graphene powder with a laponite binding agent and adding a mixture comprising the graphene powder and the laponite binding agent to water.

In some embodiments, forming the first colloidal ink solution includes a viscosity between 5 and 500 cP.

In some embodiments, forming the second colloidal ink solution includes a viscosity between 5 and 500 cP.

In some embodiments, forming the first colloidal ink solution includes a storage modulus between 5 and 500 cP.

In some embodiments, forming the second colloidal ink solution includes a storage modulus between 5 and 500 cP.

In some embodiments, sintering the 3D structure includes curing the 3D structure at a temperature between 40 and 250° C.

In some embodiments, fabricating the multi-material composite structure includes a density between 0.8 and 1.5 g/cm3.

In some embodiments, fabricating the multi-material composite structure includes copper-iron composite structure. In some cases, fabricating the copper-iron composite structure includes fabricating a copper-iron interface with hardness between 10 and 200 HV.

In some embodiments, fabricating the multi-material composite structure includes a copper-graphene composite structure. In some cases, fabricating the copper-graphene composite structure includes fabricating a copper-graphene interface with hardness between 10 and 200 HV.

The direct ink printing process is performed at ambient temperature and it is separate from the post-processing step (e.g., sintering) of the final printed composite structure. As a result, the described approach allows the printing of multi-material composite structures with improved structural, electrical, and mechanical properties with large-scale multifunctional architectures. For example, the printing of materials with different melting points or with limited miscibility (e.g., metal-ceramic composite such as copper-graphene) is enabled due to the direct ink printing at room temperature.

In the described method the printing powder is mixed with the binder (or binding agent) to allow printing of the desired metal parts. The binding agent can serve as an adhesive to hold the powder particles of the material together. The resulting metal parts (or green parts—metal matrix held by adhesive) can be used in non-stress applications or undergo post-processing steps (e.g., sintering or UV curing) and be used in other applications. The described approach allows homogenous mixtures to form that include two solid powders and a final part with improved electrical, thermal or mechanical properties. Since the sintering step takes place separately from the printing step, there is no burn out of the binder and the final printed part has increased density.

The details of one or more embodiments of these methods are set forth in the accompanying drawings and the description below. Other features, objects, and advantages of these methods will be apparent from the description, drawings, and claims.

DESCRIPTION OF DRAWINGS

FIGS. 3A-3F are scanning electron micrographs (SEM) with an elemental map showing the topography of a printed copper structure using direct ink writing technique.

DETAILED DESCRIPTION

This specification describes methods for fabricating multi-material composite structures using colloidal metal-based ink, formed from metal powder, and direct ink writing method. The colloidal metal ink includes rheological and viscoelastic properties (e.g., shear-thinning behavior, viscosity, storage modulus, or yield strength) for use with a direct ink writing (or printing) process to produce multi-material (e.g., metal-ceramic) composite parts with custom structural architecture at ambient conditions. The colloidal metal ink can include a silica-based binder. The silica-based binder can serve as an adhesive to hold the grains in the metal matrix of the printing powder under ambient conditions. In some implementations, the metal-ceramic composite structure includes a copper-graphene composite structure. In some implementations, the metal-ceramic composite structure includes a copper-iron composite structure.

The described approach forms a colloidal metal ink suitable for the direct ink printing process with a shear-thinning behavior and a desired apparent viscosity, which facilitates the extrusion of the ink through a printing nozzle without high printing pressure. In addition, the colloidal metal ink has appropriate viscoelastic properties (e.g., high storage modulus and yield strength) that allow the deposited ink layer to maintain its filamentary shape after extrusion from the printing nozzle. Using the direct ink writing process allows the printing process to be a separate step from the post-processing step (e.g., a fusion of metal powder by sintering) which enables the opportunity for 3D printing of multi-material metal parts.

Figure 1:
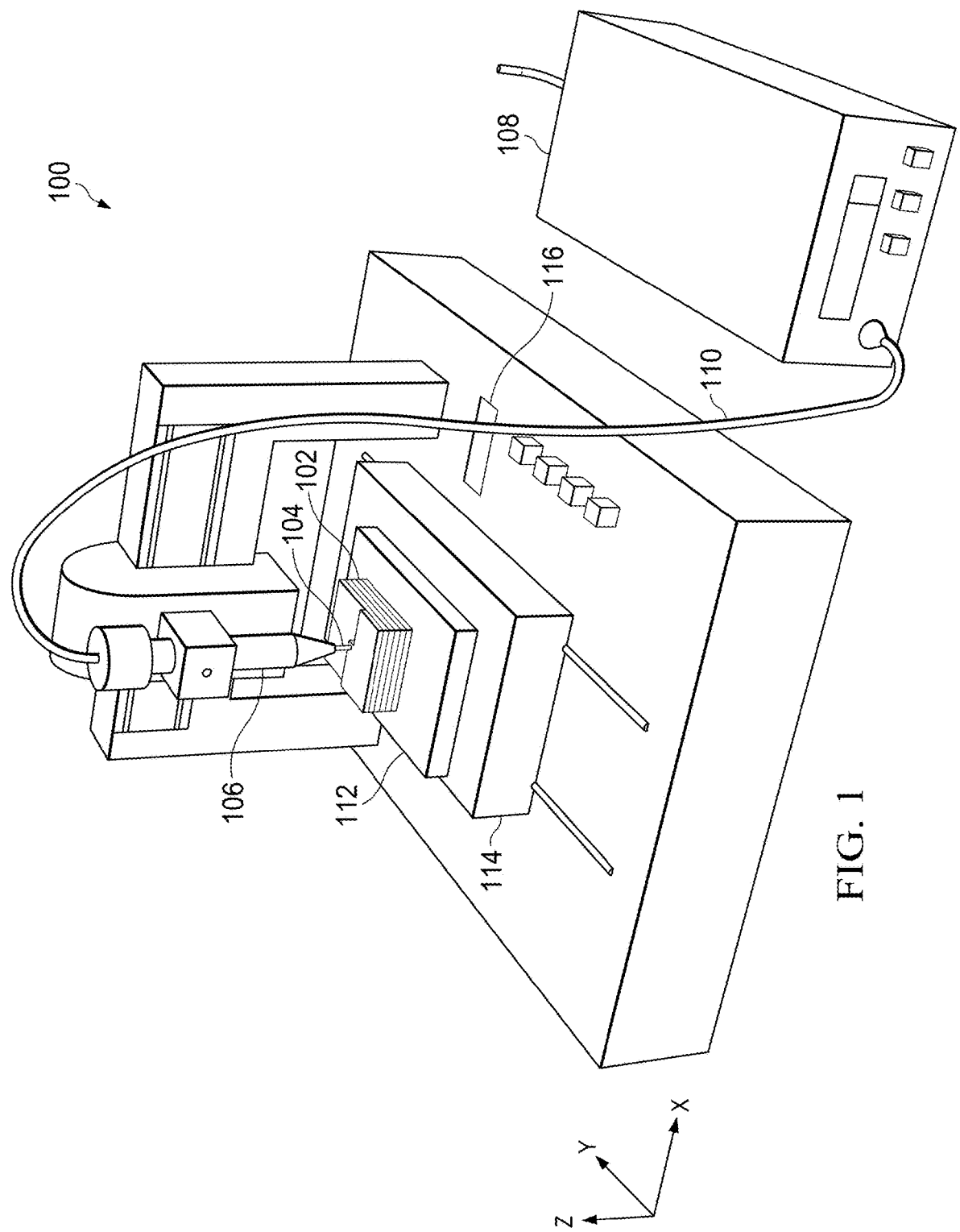
FIG. 1 is a schematic view of an example of direct ink printing equipment including a 3D printed composite structure.

FIG. 1 is a schematic view of an example of direct ink printing equipment 100 including a 3D printed composite structure 102. The direct ink printing method is an extrusion-based process that offers rapid fabrication of complex structures by deposition of colloidal inks in a layer-by-layer approach. The layer-by-layer approach allows the printing of 3D structures with improved properties and functionality. The direct ink printing method can be compatible with a wide range of materials such as polymers, ceramics, metals, composites, and combinations thereof. The direct ink printing method uses 3D printer 100 (e.g., Hyrel3D 30M system), at room temperature, to fabricate 3D composite structures 102 by depositing colloidal metal-based ink 104. The 3D printer 100 includes a cold flow syringe head 106 (e.g., SDS-30 Extruder) to extrude the ink 104 layer-by-layer and form the 3D composite structure 102 at ambient conditions. The 3D printer 100 is attached to a pressure controller 108 via an air pressure pipe 110 that pressurizes the syringe head 106 to deposit the ink 104. The ink 104 is deposited on a substrate 112 (e.g., rubber-lined glass plate) that facilitates ease of post structure removal from the print bed. The substrate 112 is placed on a moving stage 114 that can move in x, y, and z-directions. Prior to printing, the user uses software (e.g., Slic3r based on a G-code script) to generate a specific printing job. The printing job can include a print pattern and geometry, layer height, extrusion width, printing speed, and printing orientation. The display screen 116 shows the printing job in progress. In operation, a multilayer deposition such as the composite structure 102 can include loading the ink 104 then printing layer-by-layer until the final layer is deposited. In some implementations, the composite structure 102 is a copper composite structure. In some implementations, the composite structure 102 is a metal-ceramic composite structure such as a copper-graphene composite structure. In some implementations, the composite structure 102 is a metal-ceramic composite structure such as a copper-iron composite structure.

Figure 2A:
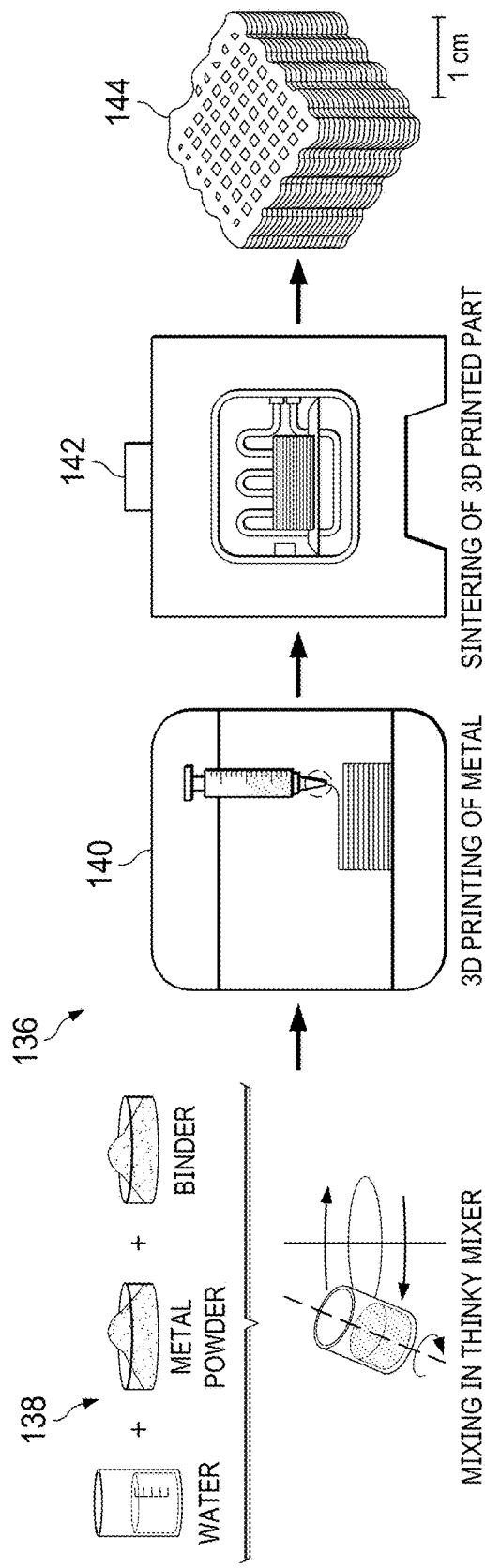
FIGS. 2A-2C show methods for fabricating metal-based composite structures.
Figure 2B:
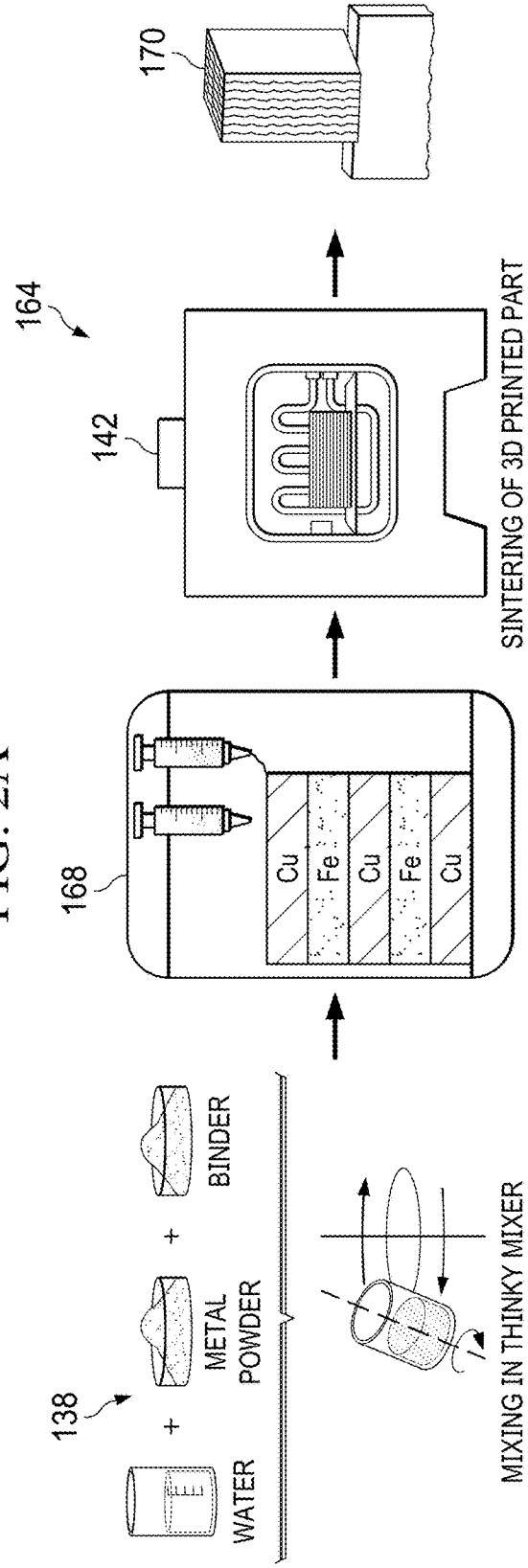
Figure 2C:
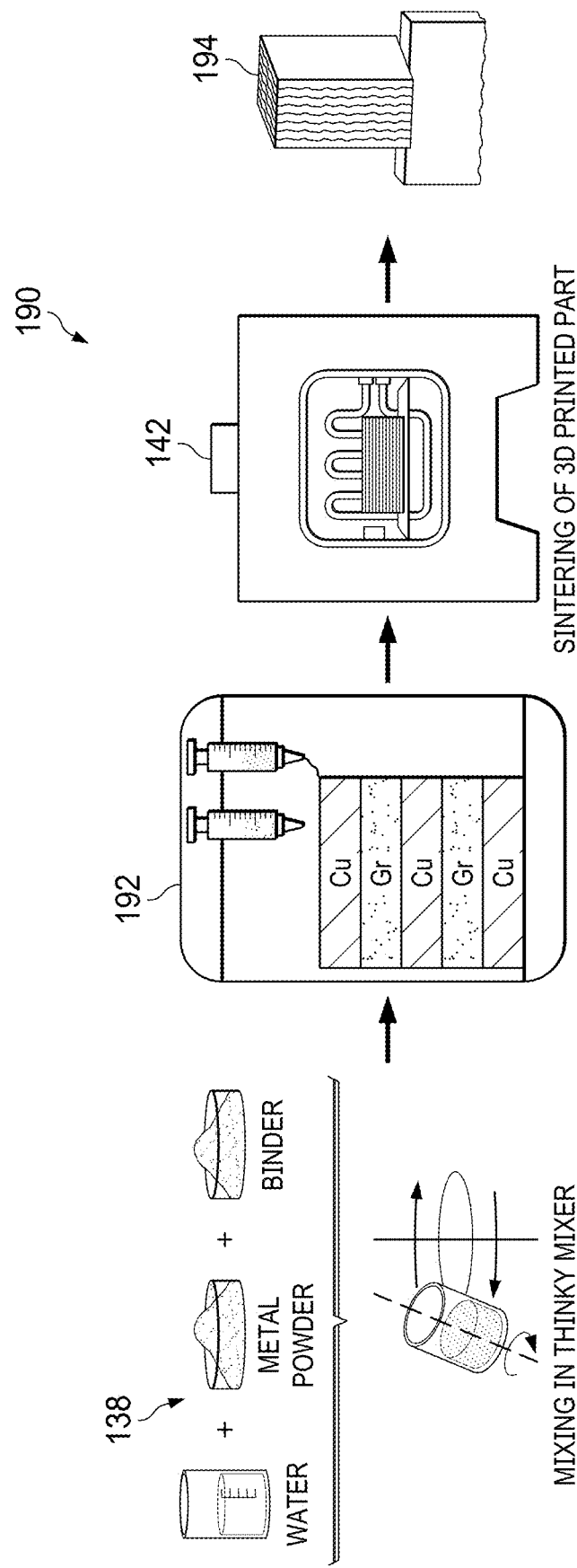
Figure 3E:
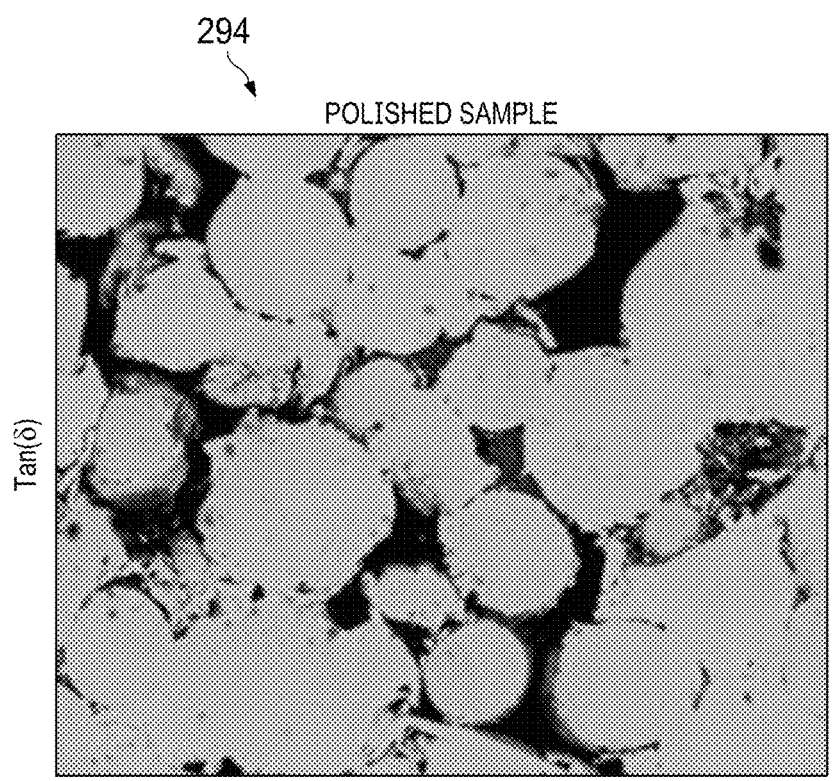
Figure 3F:
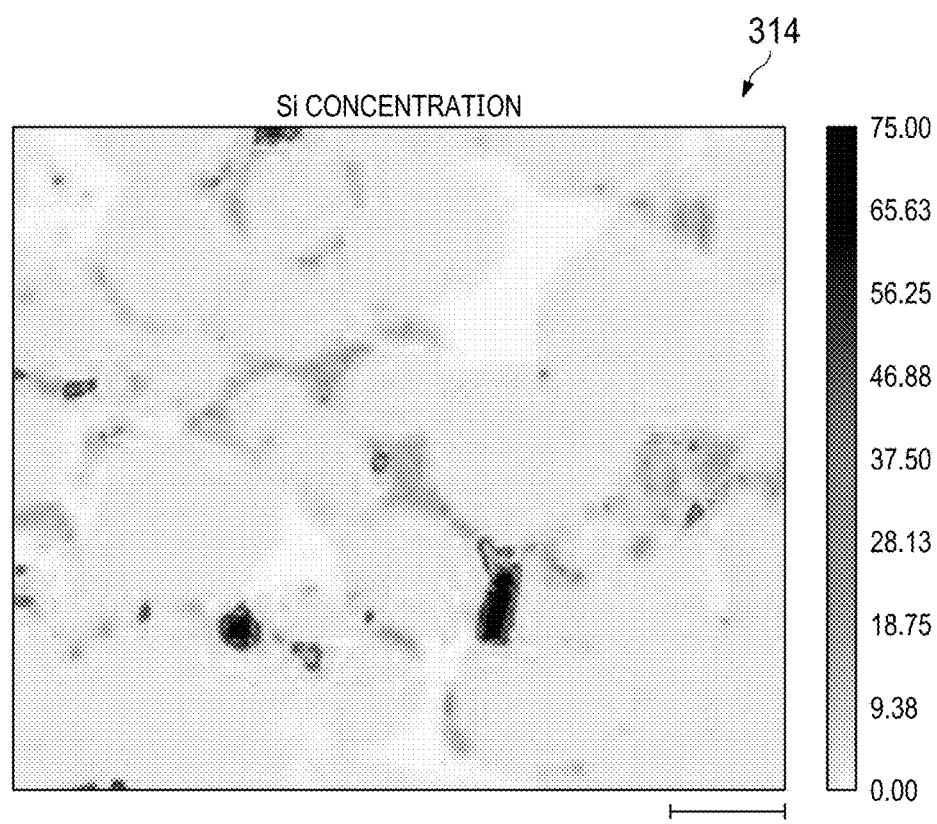

FIGS. 2A-2C show methods 136, 164, and 190 for fabricating various composite structures 144, 170, and 194. As illustrated, in method 136 a pure copper composite structure 144 is printed using the direct ink writing method. Copper is a widely used material in many applications due to its excellent properties such as malleability, high corrosion resistance, and excellent electrical and thermal conductivities. However, the printing of pure copper using common printing techniques (e.g., selective laser melting (SLM), selective electron beam melting (SEBM), direct laser fabrication (DLF), and laser metal deposition (LMD)) can be a challenge because copper can cause thermal issues due to its high conductivity and optical reflectivity leading to delamination, layer curling during printing, and final part failure. Method 136 demonstrates printing of pure copper structure 144 initially by designing a viscoelastic ink with rheological characteristics suitable for the direct ink printing process.

The design of the viscoelastic ink includes combining proper ratios of copper powder (available from Sigma-Aldrich, USA) and a binding agent—laponite (or layered synthetic nanoclay with chemical formulation Si8Mg5.45Li0.4O24Na0.7 available from BYK, USA). Then the solid constituents (i.e., the metal powder and the binding agent) and water were mixed with Planetary Centrifugal Mixer (AR 230, Thinky, USA, Inc.) at a speed of 2000 revolutions per minute (rpm) for 4 minutes (138). Three 440-type stainless steel balls, ¼-inch in diameter, were used during the mixing of the ink to create a uniform ink solution.

To achieve a high-resolution 3D printing green part of the copper composite structure, the metal ink needs to uniformly extrude through the nozzle without cutoff and particle jamming during the printing process. The binding agent (e.g., laponite) prevents particle jamming in the nozzle and the separation of metal and water under pressure. The uniform ink solution was loaded in a 30-milliliter (mL) syringe (e.g., Luer-lock) and vibrated to remove air bubbles before printing and prevent discontinuity in the printed layer. Smooth-flow tapered tips (e.g., Nordson EFD) were used to reduce the effect of clogging and printing discontinuity during the dispensing of the ink through the syringe. The printer 3D is triggered and printing of the copper part layer-by-layer is initiated at ambient conditions (140). After printing, the structure was stored at room temperature until the water evaporates to obtain a robust structure. Once the water evaporates fully the copper composite structure is taken to a sintering station (e.g., an oven) and sintered at the right temperature and environment depending on the metal powder under sintering (142). For example, in this method, the copper-based structure 144 is sintered at 950° C. to reach a fully copper part. As illustrated, the metal ink printing procedure (140) of the copper composite structure 144 is fully separated from the sintering step (142) of the copper composite structure 144. The resulting structure of the printing step (140) is called a part in a green state which requires sintering to fuse the metal particles together and create a fully dense part 144. Creating a viscoelastic ink that includes properties adequate for use in the direct ink printing method is an important step in fabricating printed composite structures at ambient conditions. In this example, the copper composite structure 144 was printed using a 1.6 mm tapered nozzle, with a 2.5 cm length, 2.5 cm width, 2 cm height, and approximately 40 layers. Using the described approach multi-material composite structures can also be printed.

Methods 164 and 190 show steps for printing copper-iron composite structure 170 and copper-graphite composite structure 194. Methods 164 and 190 follow the same steps described in reference to method 136. The exception is preparing and mixing two different inks and loading the inks into two different syringes. In some implementations, the method 164 uses more than two inks for example three, four, five, six, ten, and more. In method 164, a copper-based ink and an iron-based ink were prepared using the steps described in reference to method 136. The copper-based ink was loaded in a first syringe and the iron-based ink was loaded in the second syringed. As illustrated, the two syringes print in an alternating fashion where the first syringe takes a turn to print a first copper layer then it stops and the second syringe takes a turn to print the second iron layer and the process continues till the final part is created (168). In method 190, the steps are the same as those described in reference to method 164 except the second syringe is loaded with a graphene-based ink. As illustrated, the two syringes print in an alternating fashion where the first syringe takes a turn to print a first copper layer then it stops and the second syringe takes a turn to print the second graphene layer and the process continues till the final part is created (192). The described methods 136, 164, and 190 show the possibility of printing copper-based dense composite structures which is not attainable using other printing methods.

FIGS. 3A-3F are scanning electron micrographs (SEMs) 214, 234, 254, 274, and 294 with an elemental map 314 of the printed copper structure 144 using the method 136 described in reference to FIG. 2A. Scanning electron microscopy (SEM) (e.g., FEI Quanta 400) with 20 kV accelerating voltage was used to observe the morphology of the printed copper structure 144. The SEM images 214, 234, 254, 274, and 294 of the printed copper structure 144 show uniform distribution and bonding of the particles in different magnification. SEM image 234 shows a polished (top part) and an unpolished (bottom part) of the printed copper surface. SEM images 254, 274, and 294 show grain size of copper particles between 10 and 20 microns and high-quality fusing of the particles together after sintering. The fusing of the particles together is also a result of the presence of the silica-based binding agent. Using an energy-dispersive (EDS) detector an elemental map distribution 314 confirmed the presence of the silica-based binding agent in the final printed copper part 144. The presence of silicon elements shown with map 314 corresponds to the nanoclay in the printed part. The overlay of silica (Si), which is the main element of nanoclay, indicates the uniform distribution of nanoclay in the copper ink. The nanoclay binds to the copper particles and keeps them together yielding a self-supporting solid structure. The nanoclay remains among the copper particles even after sintering. The selection of the right binding agent plays an important role in the performance of the final product and the rheological properties of the printing ink.

FIGS. 4A-4E are charts 334, 354, 374, 394, and 395 showing the overall properties of a copper-based ink and a printed copper structure 144. Charts 334 and 354 illustrate the rheological properties of an unmodified copper-based ink (i.e., without a binding agent) and a copper-based ink (i.e., with a binding agent) as described earlier in reference to FIG. 2. The rheological properties were measured using a Couette geometry rheometer with a stress-strain controller (e.g., MCR 302, available from Anton Parr, Austria). Flow and viscosity curves for both inks were obtained with strain-rate controlled measurements at shear rates between 100 s and 0.001 s. Oscillatory amplitude sweeps were performed at an angular frequency of 1 Hz with a strain between 0.01 and 10%. Chart 334 shows that the viscosity of the modified copper-based ink (i.e., with a binding agent) is two orders of magnitude greater than the viscosity of the unmodified copper-based ink (i.e., without a binding agent) which also shows a shear-thinning behavior. The unmodified and modified copper-based inks have a viscosity of 1.75 Pa-s and 1.28 Pa-s at the shear rate of 100 s$^{-1}$, respectively. At a lower shear rate (~1 s$^{-1}$), the unmodified copper ink displays a viscosity of ~43 Pa-s while the modified copper ink shows a viscosity of ~322 Pa-s, which is approximately seven times higher than the viscosity of the unmodified ink. Chart 354 shows the storage and loss modulus of both inks as a function of oscillatory strain. The modified copper-based ink has a relatively higher storage modulus compared to the unmodified copper-based ink. The higher storage modulus allows the printed structures to maintain their structural integrity right after printing. For copper layers to be printed on top of one another the copper ink should have a large storage modulus to retain the filamentary shape after extrusion from the nozzle and tolerate the weight of the top layer without deformation. The modified copper ink exhibits a significantly higher storage modulus (G') than a loss modulus. The addition of the binding agent in the modified copper-based ink gives a storage modulus of around 17.9 kPa at a low strain of 0.1% and a loss modulus of 1.1 kPa.

A loss tangent (tan δ) measurement is an additional evaluation parameter used for the viscoelastic analysis of materials and the comparison between viscous and elastic material behavior. The loss tangent (tan δ) measurement is the relative dissipation or the ratio of G"/G', related by a phase angle. For the modified copper-based ink, the loss tangent value is less than unity at low oscillation strain, indicating a more solid-like (or elastic) response of the ink and thus it facilitates the filamentary shape retention while exiting the printing nozzle.

The printed copper structure 144 is also evaluated for the amount of density it retains as printed with respect to its theoretical density (e.g., between 77 and 88%). Using current methods for printing copper where selective sintering burns the binding agent result in printed copper parts with low density. The sintered copper parts are porous and have a density lower than the theoretical density of copper (e.g., between 77 and 88%). Using direct ink printing with adequate ink as described can result in pure copper printed structure with increased density and reduced porosity. In this example, the relative density of the printed copper structure 144, using the described approach, is measured at 94.25% after sintering based on ASTM B923 standards. The 94.25% relative density is based on a theoretical value of 8.96 gcm-3. In some implementations, the relative density of the printed copper structure is determined based on the grain size of the copper powder used. As illustrated in chart 374, structural characterization using X-ray diffraction (XRD) shows a matching pick pattern for the 3D printed copper structure 144 and the copper powder used before printing to make the ink. The matching patterns indicate that the printing and the sintering steps do not affect the structure and the properties of the final part. The printed copper structure 144 also shows improved electrical properties. The electrical conductivity of the copper structure is an important element for many applications such as electrical circuits, heating elements, and electrodes.

Figure 4A:
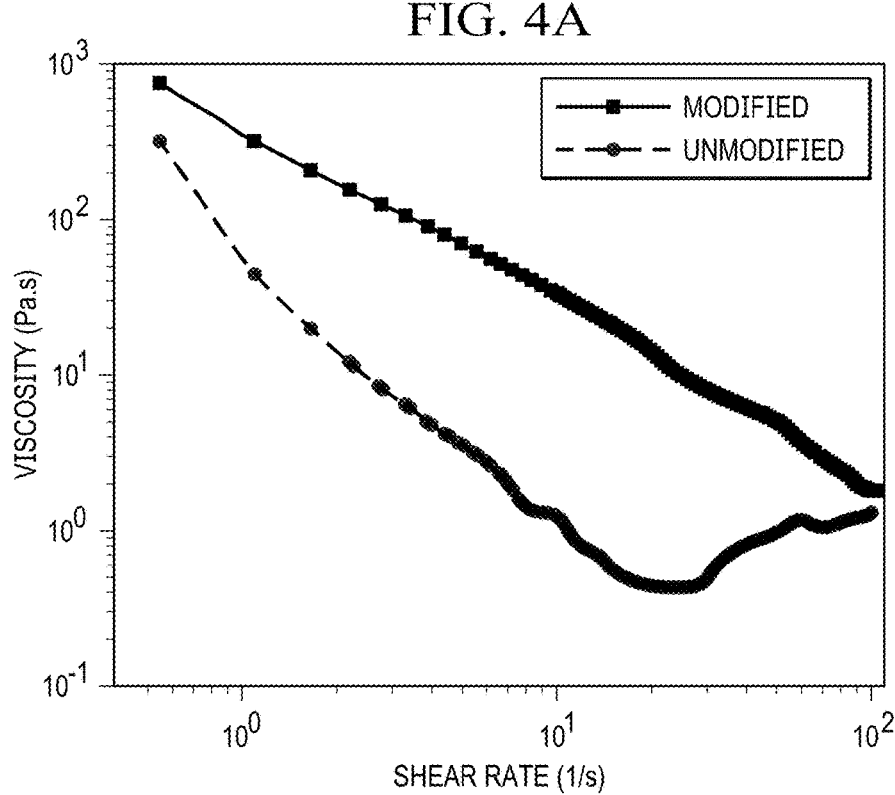
FIGS. 4A-4E are charts showing overall properties of a copper-based ink and a printed copper structure.
Figure 4B:
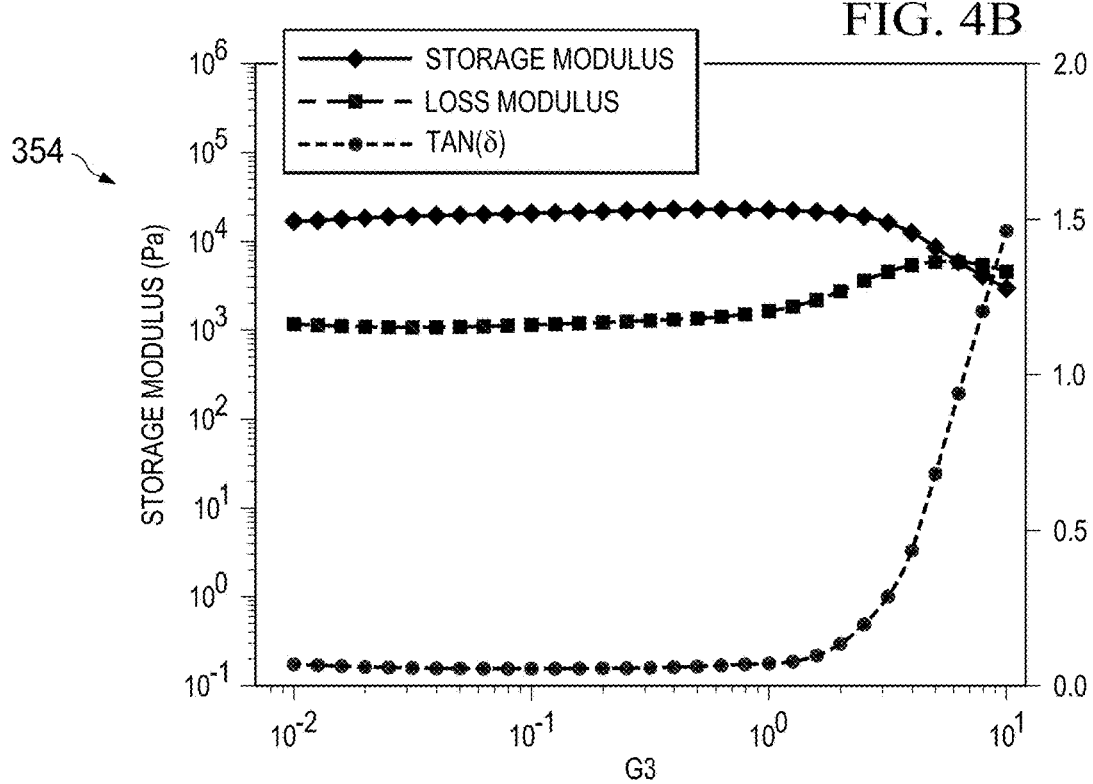
Figure 4C:
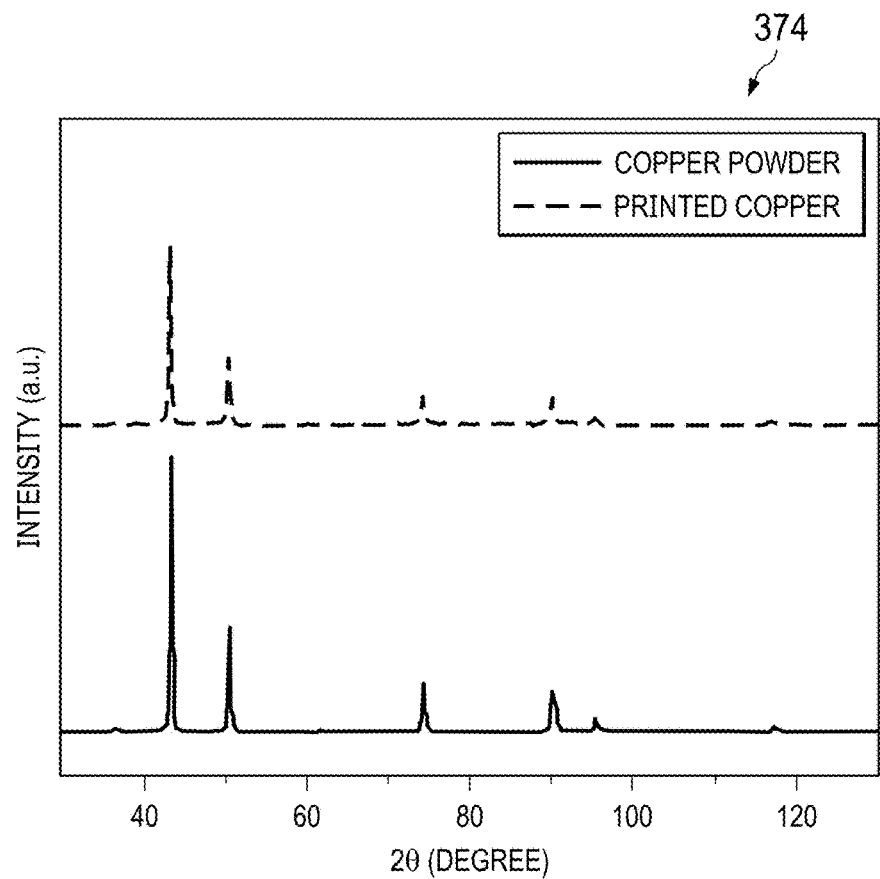
Figure 4D:
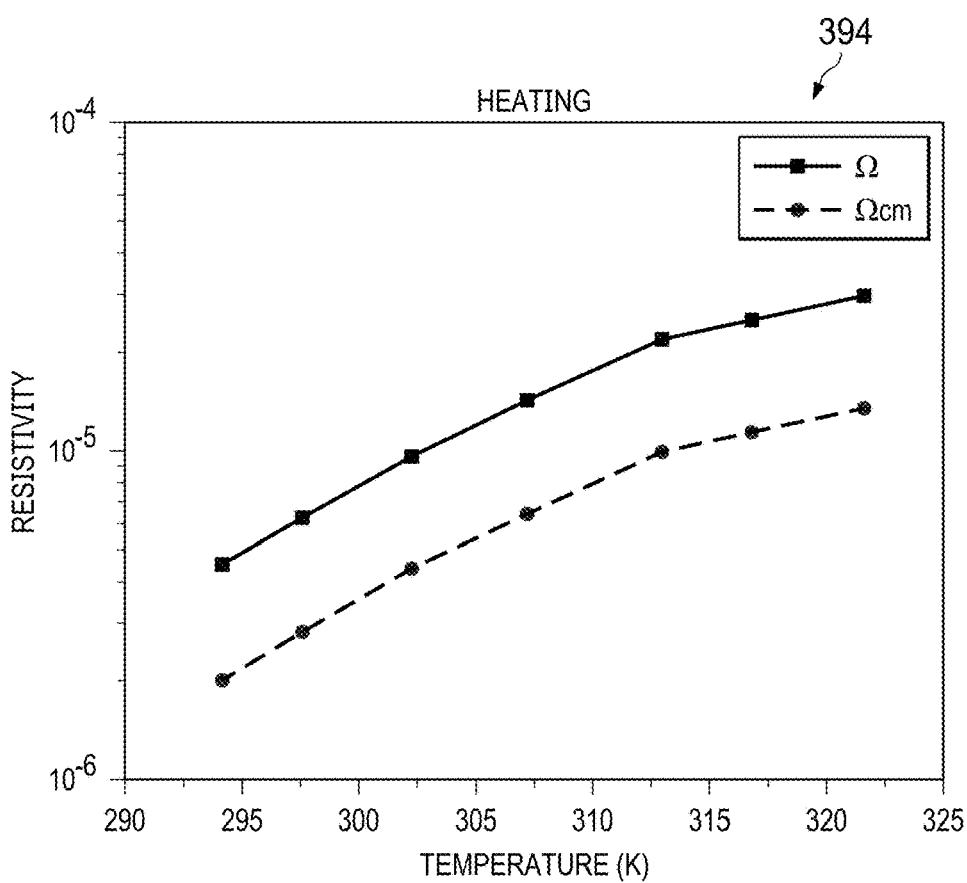
Figure 4E:
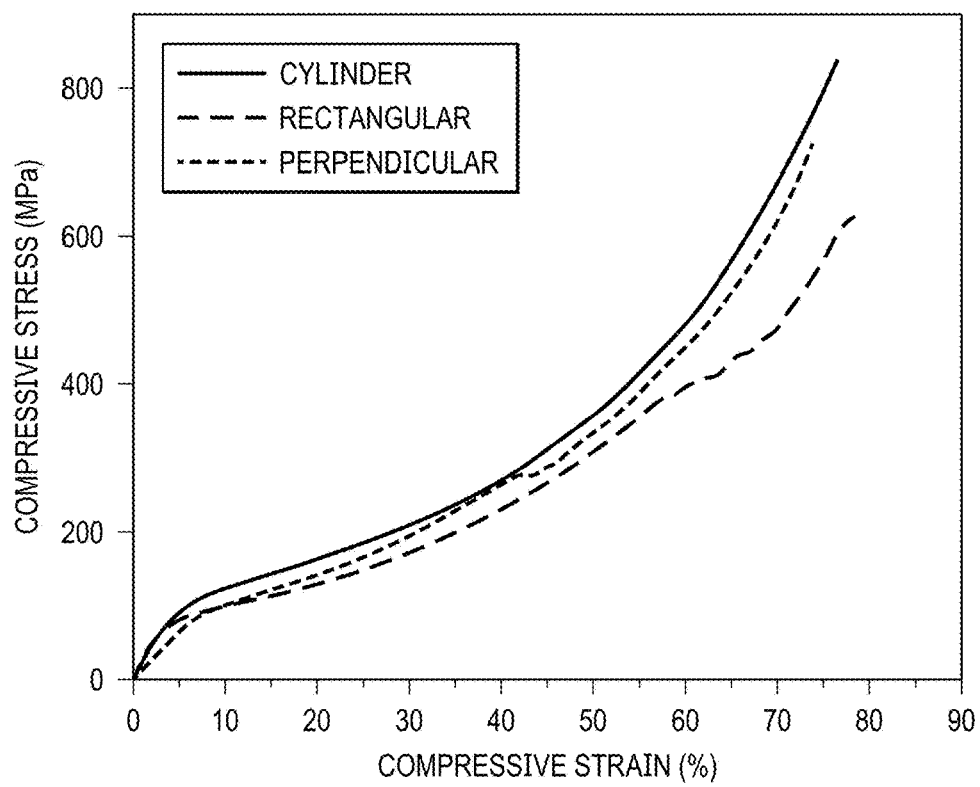
Figure 5A:
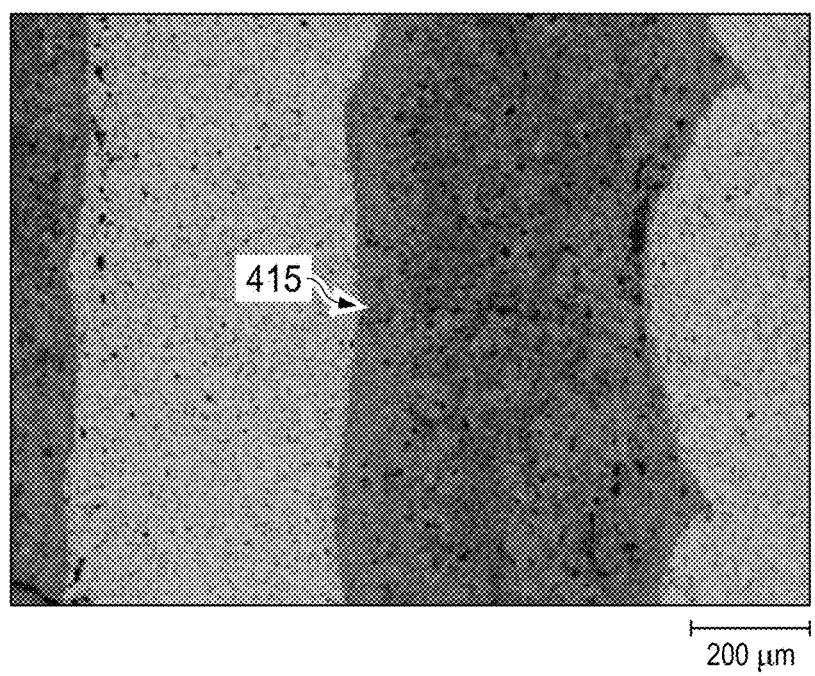
FIGS. 5A-5G are scanning electron micrographs (SEM) with elemental maps showing topography and mechanical performance of a printed copper-iron composite structure using direct ink writing technique.
Figure 5B:
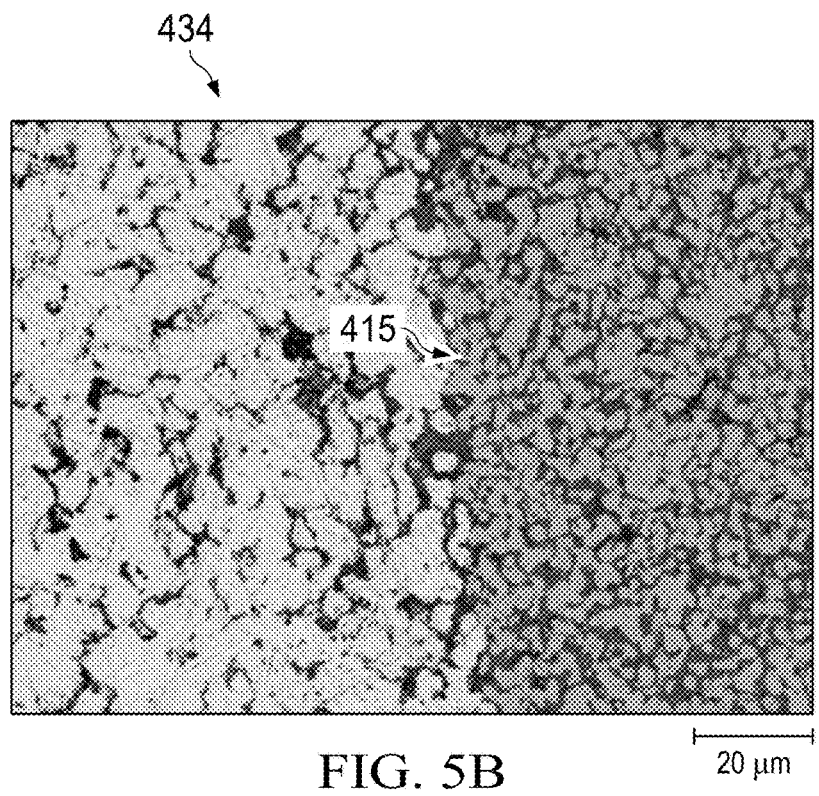
Figure 5C:
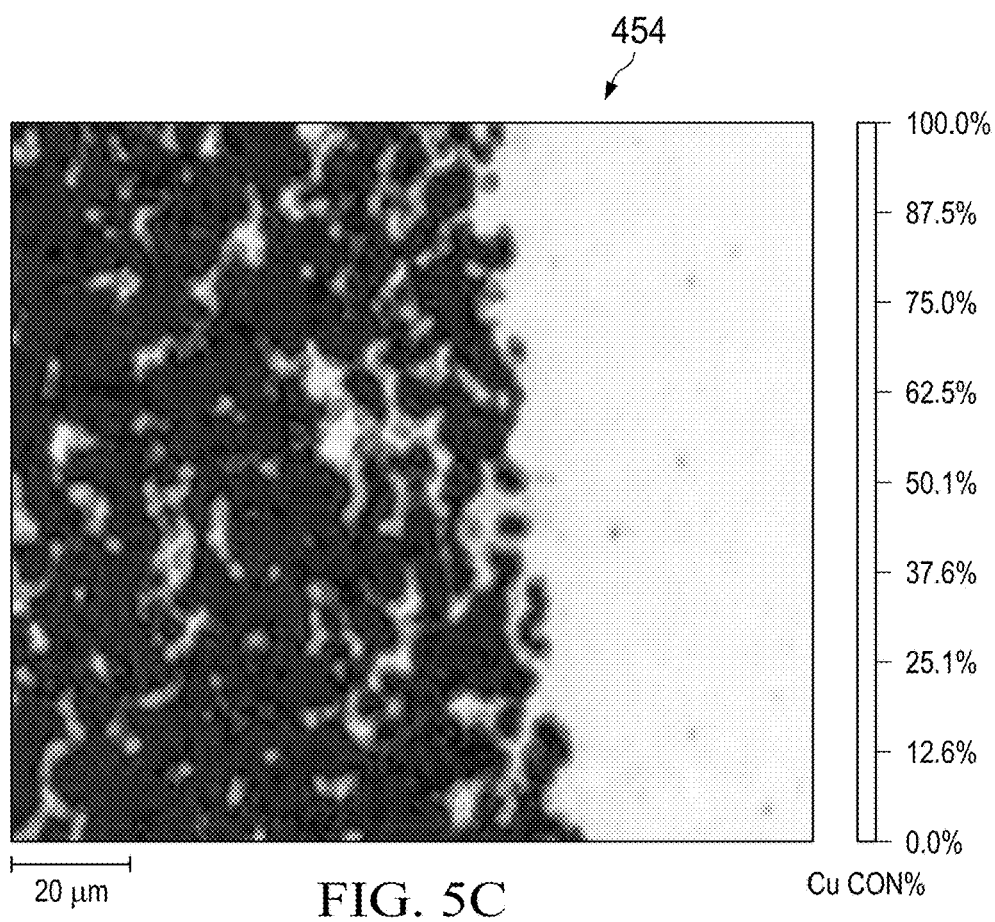
Figure 5D:
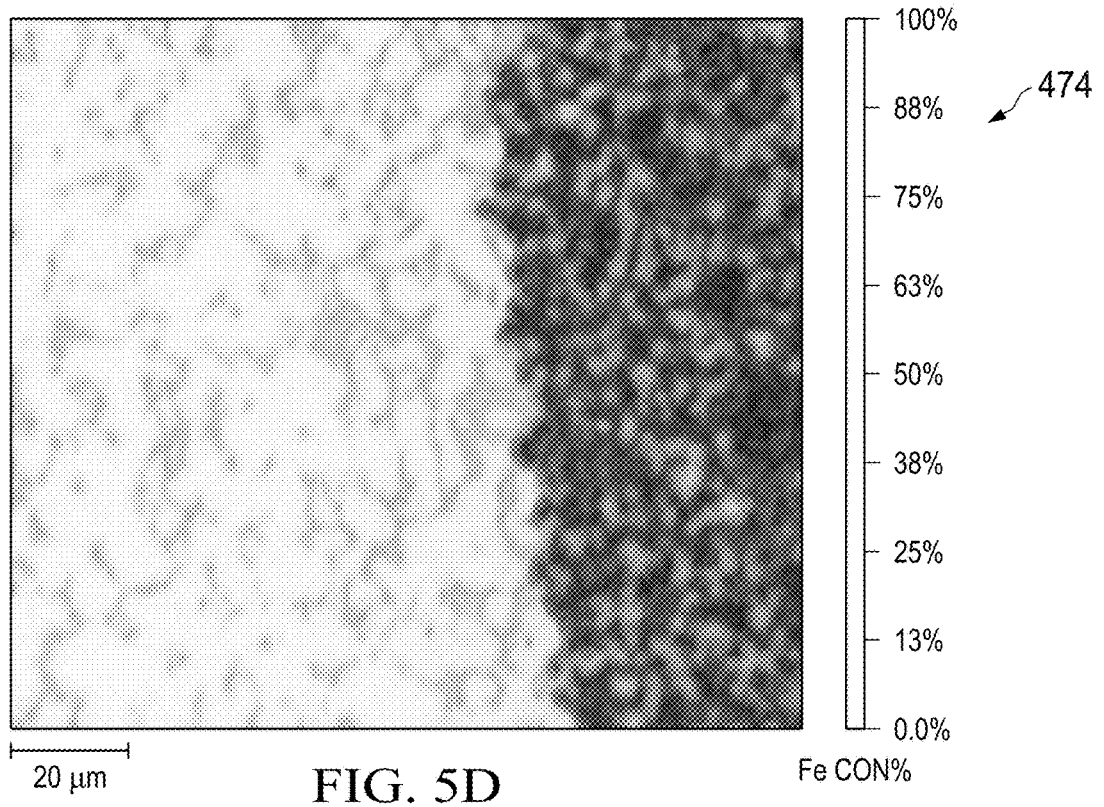
Figure 5E:
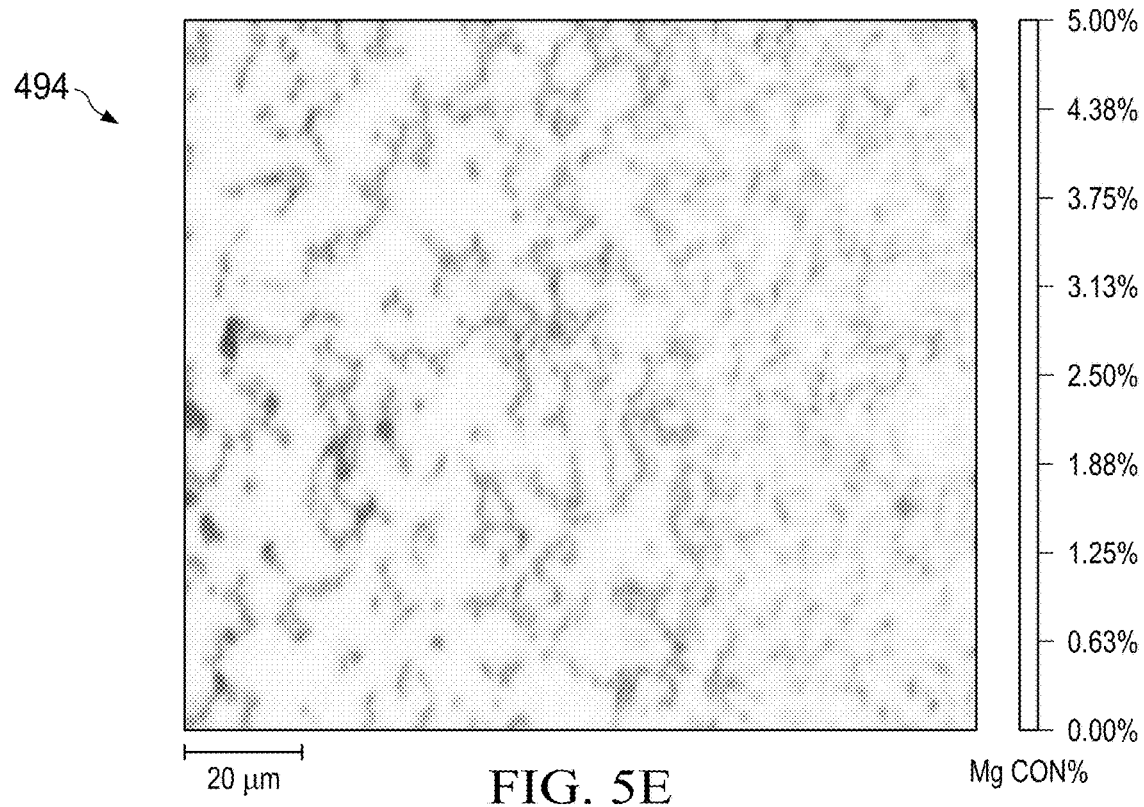
Figure 5F:
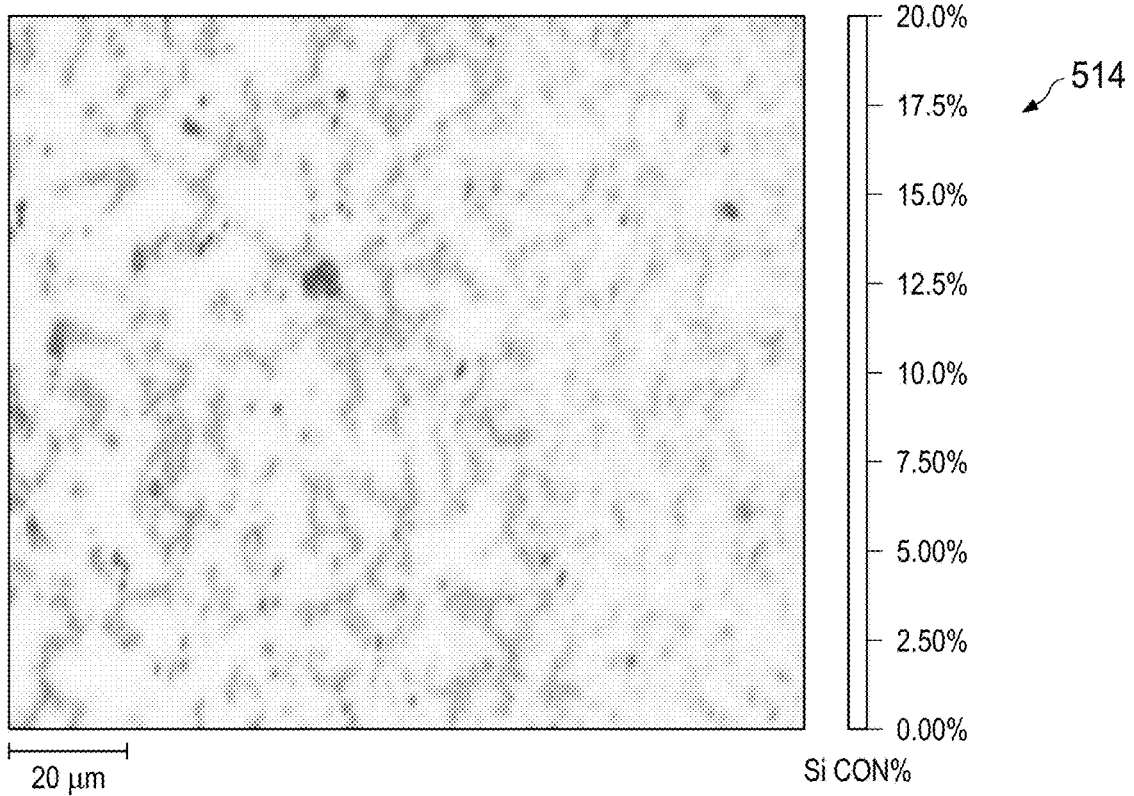
Figure 5G:
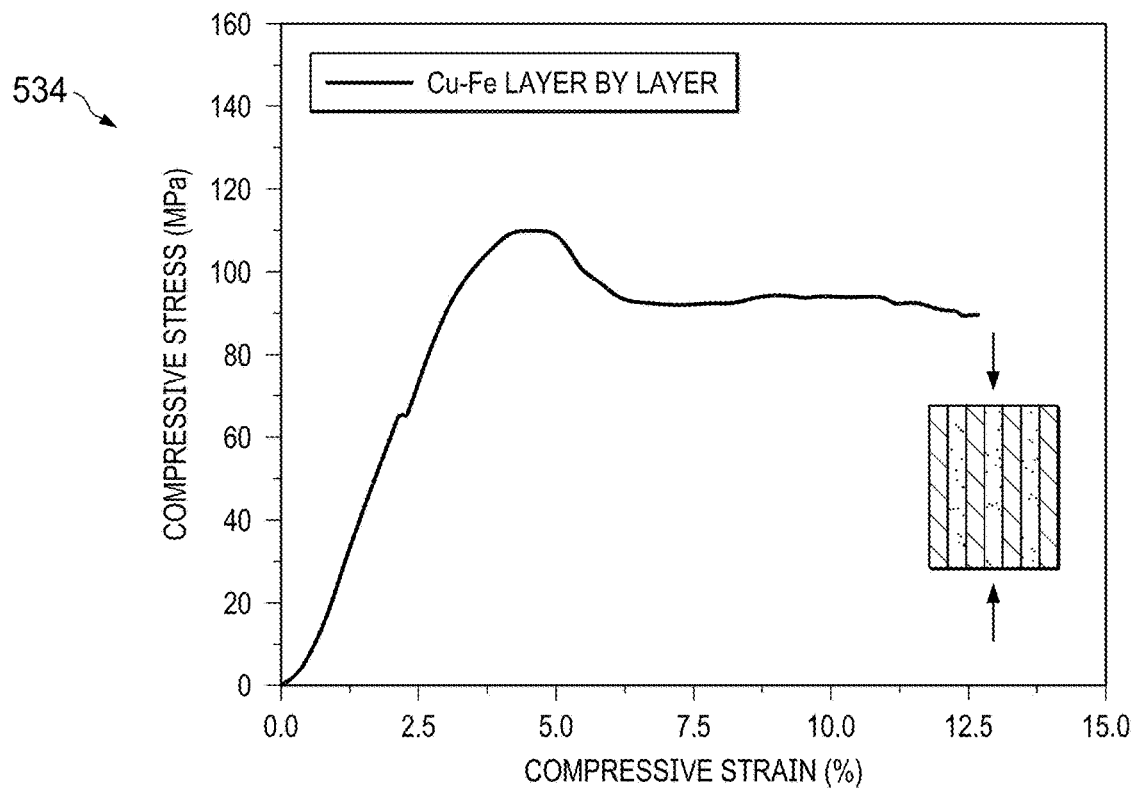
Figure 6A:
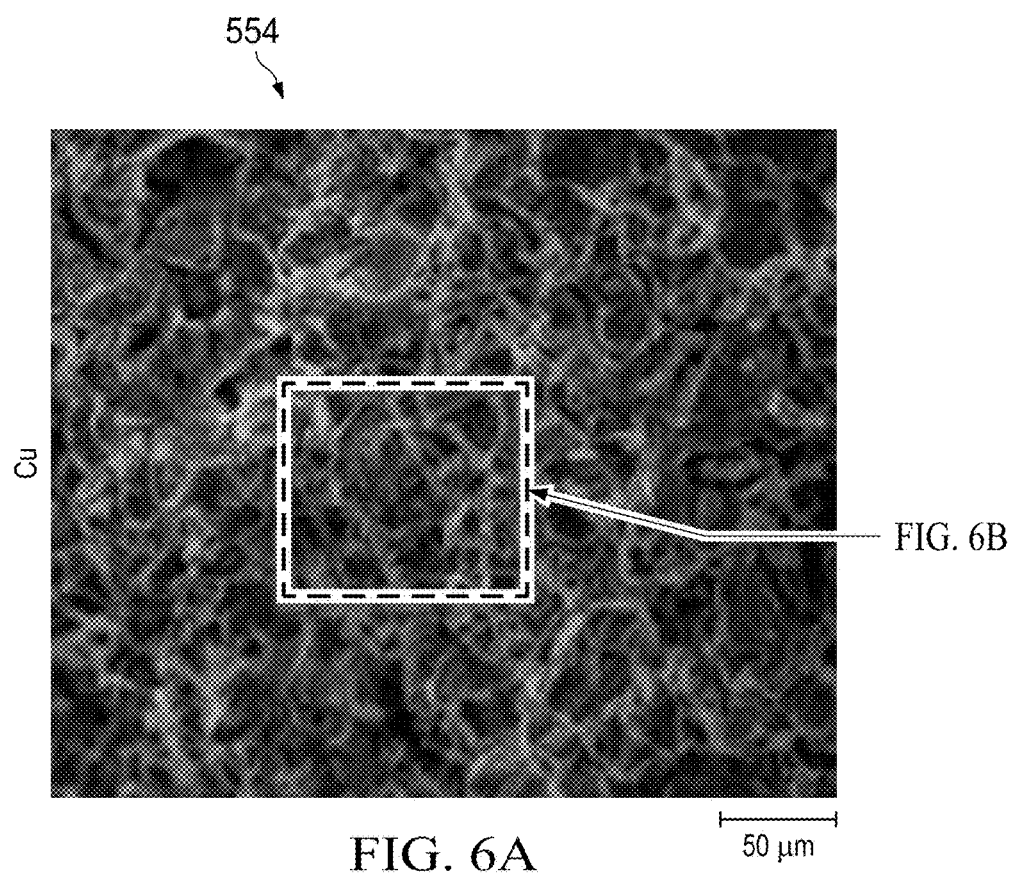
FIGS. 6A-6E are SEM images and a chart showing comparative behavior and topography of a printed copper structure vs. printed copper-graphene composite structure.
Figure 6B:
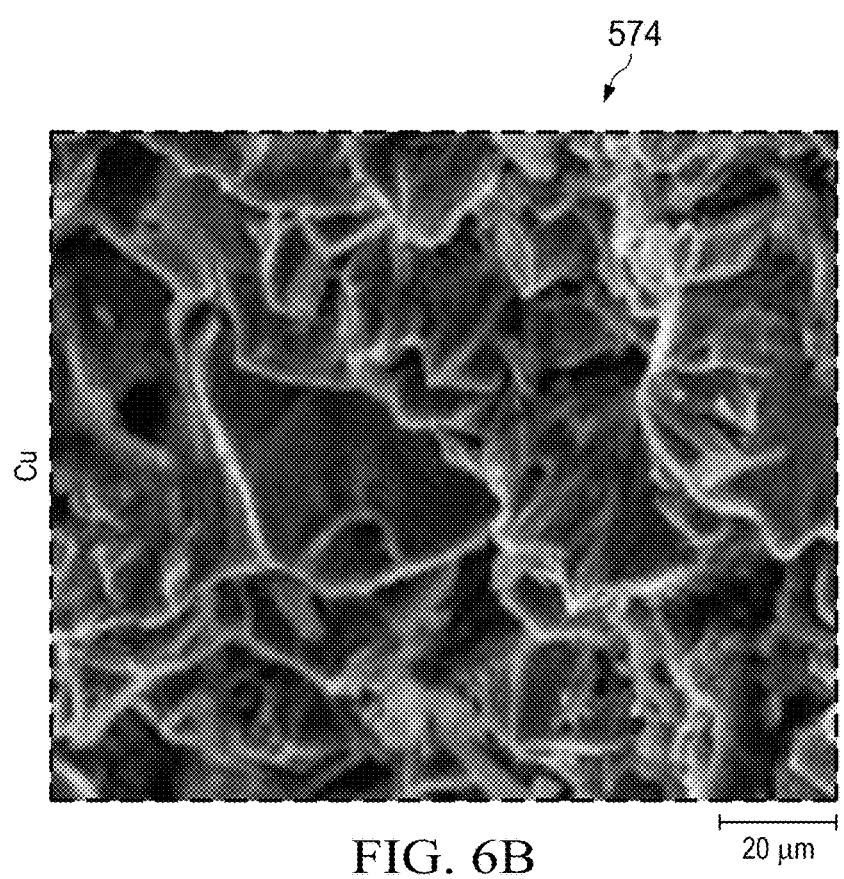
Figure 6C:
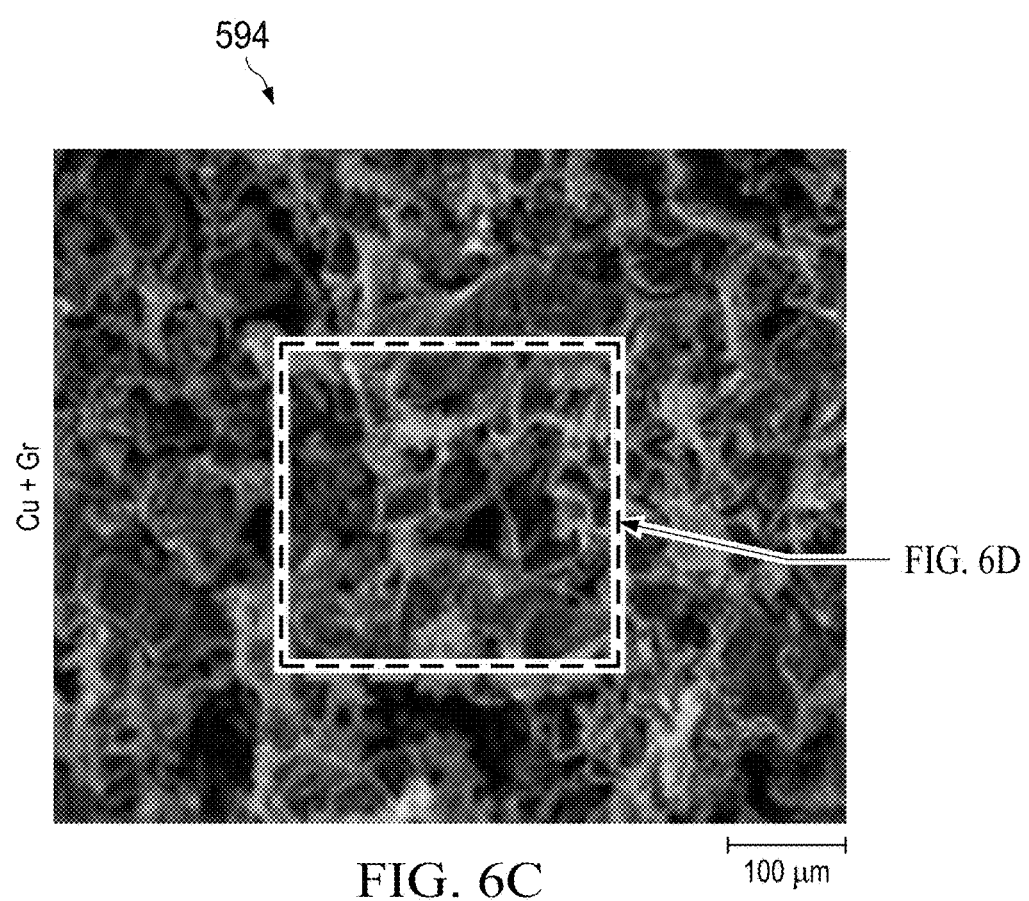
Figure 6D:
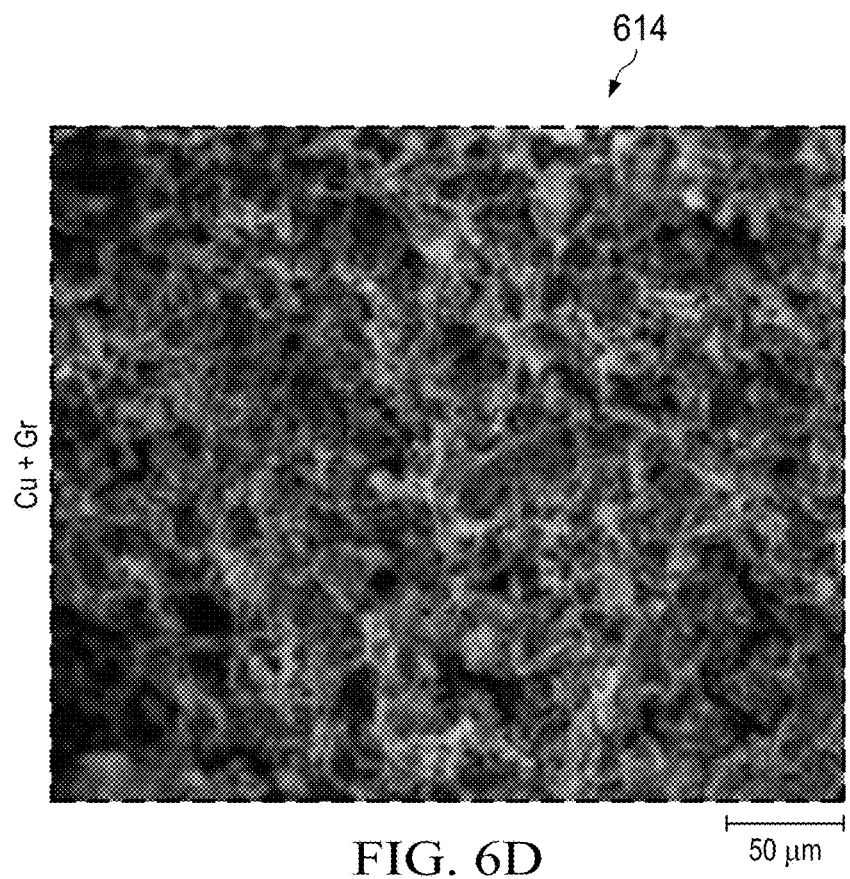
Figure 6E:
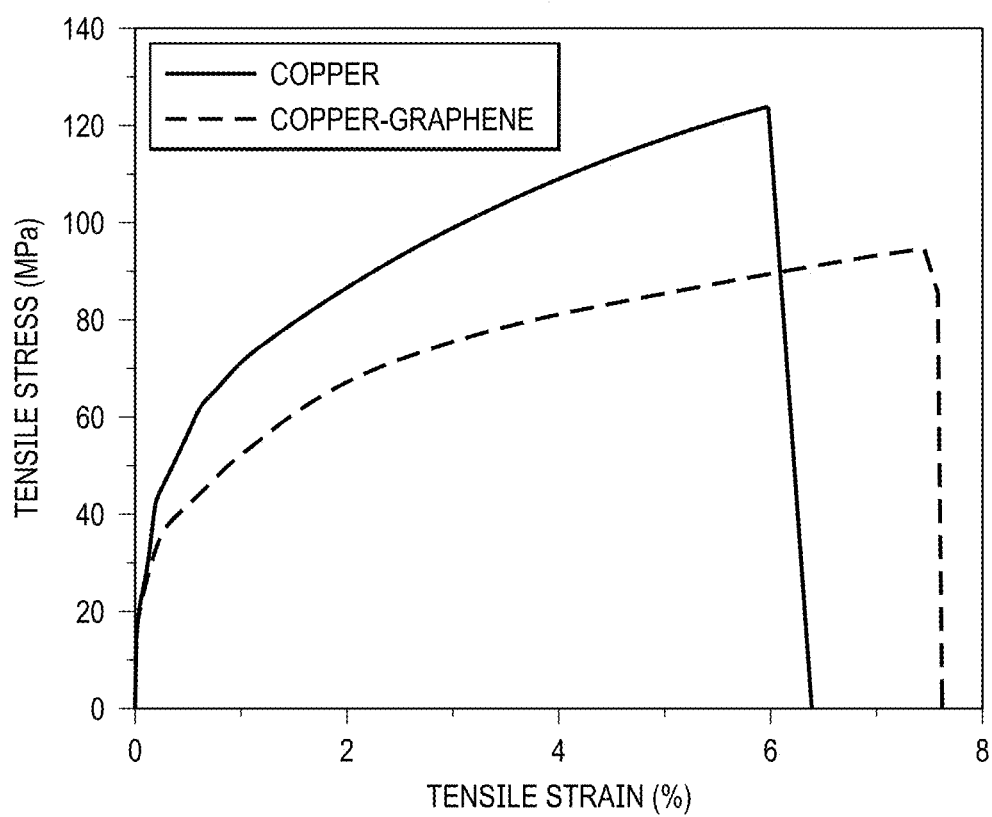
Figures 7A, 7B, 7C:
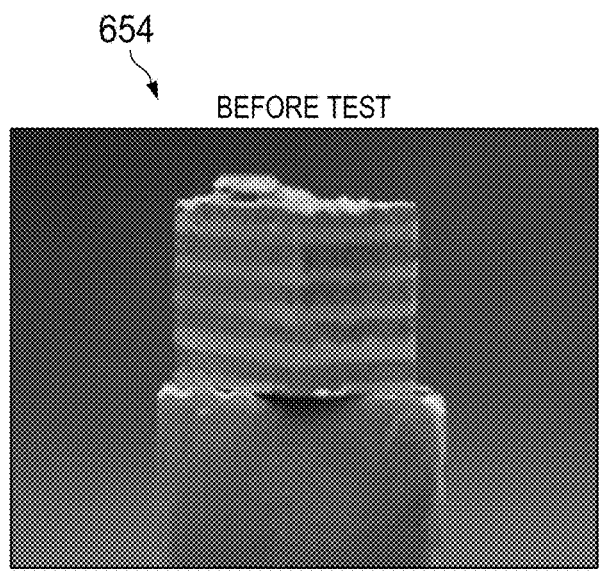
FIGS. 7A-7C are visual images showing the behavior of a printed copper-graphene composite structure under axial loading test.

As illustrated in FIG. 4D, chart 394 shows electrical resistance measurements of the printed copper structure 144 under heating at different temperatures. For example, the resistivity of the 3D printed copper structure 144 was measured approximately $2 \times 10^{-6}$ Ωcm at room temperature which is relatively close to the resistivity measured $1.72 \times 10^{-6}$ Ωcm of a bulk copper sample. The resistivity measurements indicate that the conductivity of the printed copper structures using the direct ink writing method has 86% conductivity based on the International Annealed Copper Standards guidelines. The small reduction (approximately 14%) in electrical conductivity of the printed copper part is a result of the presence of the binding agent. The binding agents are usually insulating materials and can act as potential barriers in the electronic conduction path of the final printed parts. However, the selection of the right binder is what makes printing of multi-material composite structures possible.

Chart 395 shows the mechanical performance (stress-strain curve) of printed copper structures with different geometric shapes such as cylindrical and rectangular. For example, to reduce the geometric effect on the printed copper part a cylindrical shape with a height to diameter ratio of 1.35 was printed and tested under uniaxial test. The resulting stress-strain curve is divided into three regions: elastic region (with a linear region strain of less than 5%), plastic region (with a strain between 5 and 15%), and densification region or increased density region (with a strain of greater than 15%). The printed copper structure is porous so it is densified like a foam under a high strain test. Additionally, the printing path direction can have a significant effect on the mechanical properties of the final printed part. Chart 395 shows the high mechanical performance of the printed copper structure when the force is applied perpendicular to the direction of the printing path. In this example, the printed copper structure under the perpendicular test has a rectangular shape with dimensions 10×10×15 mm.

FIGS. 5A-5G are scanning electron micrographs 414 and 434 with elemental maps 454, 474, 494, 514 showing topography and mechanical performance 534 of a printed copper-iron composite structure 170 using method 164 (direct ink writing technique). SEM images 414 and 434 of the printed copper-iron composite structure 170 show a formation of robust interface bonding 415 between copper and iron at different magnifications which is not attainable using other printing methods. Elemental maps 454, 474, 494, 514 in the vicinity of the copper-iron show the presence of copper (Cu), iron (Fe), magnesium (Mg), and silica (Si) intensity in the same region. This indicates that a string bonding interface forms between copper and iron but each printed layer still maintains structural integrity with its own properties due to the presence of a binder that remains in the final printed part 170 even after sintering at 1000° C. is completed.

Using the described approach with adequate ink allows printing of multi-material structures with performance improvements in user-definable locations. For example, building a multilayer copper-iron composite structure includes alternating layers of a soft material (e.g., copper) and a hard material (e.g., iron) which provide a better combination of strength, hardness, corrosion resistance, and ductility than each individual material alone. The direct ink printing method allows the printing of composite structures with defined properties at a target location based on the application. The materials that create the composite structure include metals powders with a similar range of sintering temperatures to prevent a thermal mismatch between the printed layers. In some implementations, the materials include different sintering temperatures but the grain size of the powder and the sintering conditions are adjusted to achieve a robust final printed composite part. The uniaxial compression test on copper-iron composite structure 170 also shows high interface strength between the two materials. Chart 534 shows compression test was applied parallel to the Cu—Fe interface. The stress-strain curve under compression test indicates that the copper-iron composite structure 170 has an elastic region of 2.5% strain and reaches a yield point above 100 MPa. The results in chart 534 show that copper-iron composite structure 170 has similar behavior to that of pure copper and strong interface bonding that does not detach during the mechanical test of the printed part. The uniaxial compressive and tensile tests for all parts were performed at ambient temperature using a universal testing machine (Instron ElectroPlus model E3000, USA). The uniaxial testing includes positioning of all samples between two crossheads and compressed at a constant rate of 2 mm-s$^{-1}$. At least five samples of the same kind were tested for consistency of the data.

FIGS. 6A-6E are SEM images 554, 574, 594, 614, and chart 634 showing comparative behavior and topography of a printed copper structure 144 vs. printed copper-graphene composite structure 194. As illustrated in chart 634, the tensile stress-strain curve indicates that the printed copper-graphene composite structure 194 is more ductile compared to the printed copper structure 144. The SEM images 594 and 614 show uniform grain distribution in the printed copper-graphene composite structure 194 which is a sign of good ductility compared to the SEM images 554 and 574 showing sharp edges analogous to plastic deformation and reduced ductility of the printed copper sample 144. The presence of an adequate binding agent facilitates printing of ductile copper-graphene composite structure 194. In this example, 3% by weight of the binder was added to the printing graphene ink.

FIGS. 7A-7D are visual images 654 (before the test), 674 (after test front view), and 694 (after test back view) showing the behavior of a printed copper-graphene composite structure 194 under axial loading test. Images 674 and 694 show cracks along the copper-graphene interface line and some perpendicular to the interface. The perpendicular crack indicates the high strength of the copper-graphene interface bonding. This is the advantage of the described method of printing composite structures that include dissimilar materials such as copper and graphene as in practice only welding techniques are to bond two dissimilar materials. The hardness test also confirms the strength of the interface bonding between two different materials using the direct ink printing method.

Figure 8:
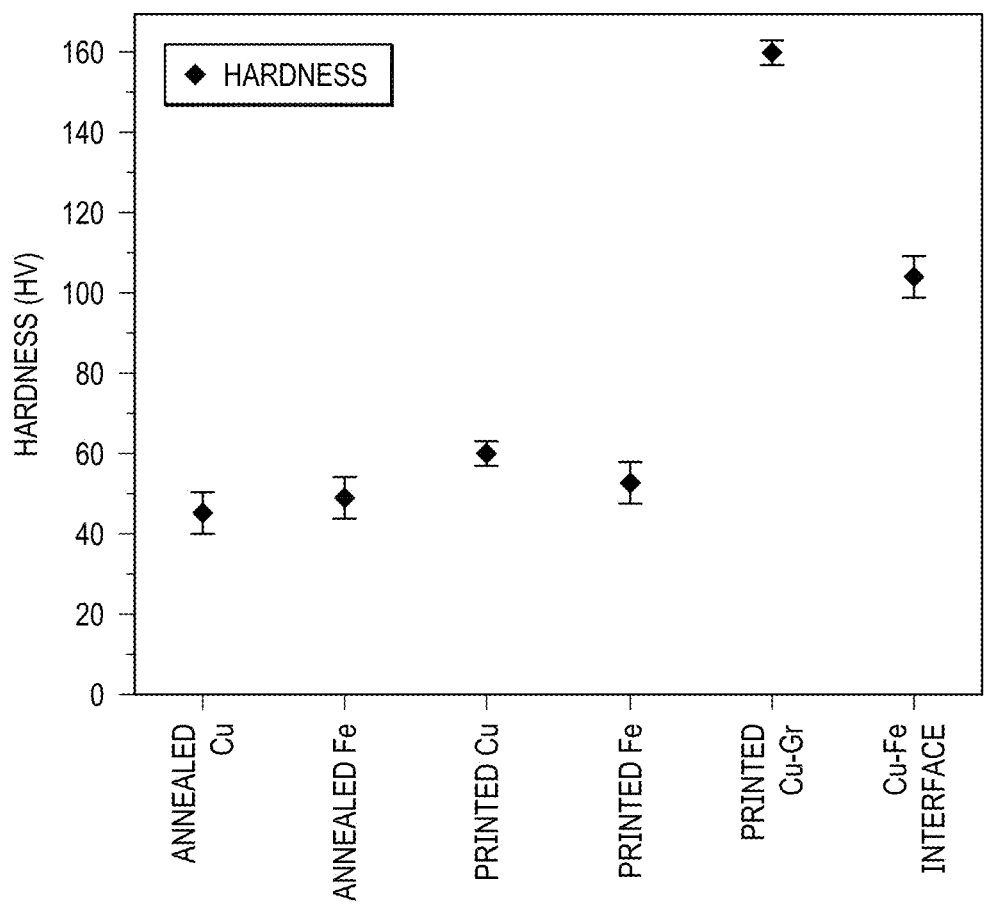
FIG. 8 is a chart showing hardness of various printed structures.

FIG. 8 is a chart 714 showing hardness of various printed structures. The hardness of the annealed Cu sample, annealed Fe sample, printed Cu sample, printed Fe sample, printed copper-graphene (Cu-Gr) sample, and the interface of printed Cu—Fe sample was measured. The hardness of the printed Cu—Fe sample and Cu-Gr sample was measured using the Vickers hardness method and compared with the rest of the samples. Chart 714 shows an average hardness of the printed Cu sample to be approximately 60 HV compared to the pure annealed Cu sample that shows hardness between 42 and 50 HV. This behavior can be explained by the Hall-Pitch effect which states when the material is under plastic deformation the dislocation will move through the material. The grain boundary in the material can be viewed as a barrier and most of the dislocation will situate in the grain boundaries increasing the strength of the material. For example, a material with a smaller grain size will have more grain boundaries in the microstructure. Therefore, the travel of the dislocation is reduced and the material strength is increased. In this example, the grain size of the printed copper samples is between 18 μm and 25 μm and the grain size of the annealed copper sample is 100 μm so the printed samples have higher strength. Similarly, the printed Fe samples have higher hardness compared to annealed pure Fe samples as the annealed Fe samples have larger grains. The printed copper-graphene sample shows the highest hardness of approximately 160 HV compared to the rest of the samples. This can be due to various aspects of material science but mainly the presence of graphene plays a critical role in preventing dislocation. The Cu—Fe interface also shows a high hardness of approximately 110 HV, which is a result of the sintering step.

While this specification contains many specific implementation details, these should not be construed as limitations on the scope of what may be claimed, but rather as descriptions of features that may be specific to particular implementations. Features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

What is claimed is:

1. A method for fabricating a multi-material composite structure, the method comprising:
   forming a first colloidal ink solution comprising a first material matrix, water, and a rheology modifying agent, wherein the first material matrix comprises iron;
   forming a second colloidal ink solution comprising a second material matrix, water, and a rheology modifying agent, wherein the second material matrix comprises copper;
   printing, by direct ink writing, a first layer on a substrate using a first printing nozzle carrying the first colloidal ink solution;
   printing, by direct ink writing, a second layer on top of the first layer using a second printing nozzle carrying the second colloidal ink solution;
   forming a 3D structure by printing, by direct ink writing, a plurality of layers comprising the first layer and the second layer printed in an alternating pattern; and
   sintering the 3D structure to form the multi-material composite structure, the multi-material composite structure comprising a copper-iron composite structure.

2. The method of claim 1, wherein forming the first colloidal ink solution further comprises mixing a copper powder with a binding agent and adding a mixture comprising the copper powder and the binding agent to water.

3. The method of claim 2, wherein forming the first colloidal ink solution further comprises mixing the mixture and the water using a mechanical mixer.

4. The method of claim 2, wherein mixing the copper powder with the binding agent comprises mixing the copper powder with a layered synthetic nanoclay agent with a chemical formulation of $Si_8Mg_{5.45}Li_{0.4}O_{24}Na_{0.7}$.

5. The method of claim 1, wherein forming the second colloidal ink solution further comprises mixing an iron powder with a binding agent and adding a mixture comprising the iron powder and the binding agent to water.

6. The method of claim 5, wherein forming the second colloidal ink solution further comprises mixing the mixture and the water using a mechanical mixer.

7. The method of claim 1, wherein forming the second colloidal ink solution further comprises mixing a graphene powder with a binding agent and adding a mixture comprising the graphene powder and the binding agent to water.

8. The method of claim 1, wherein forming the first colloidal ink solution comprises a viscosity between 5 and 500 cP.

9. The method of claim 1, wherein forming the second colloidal ink solution comprises a viscosity between 5 and 500 cP.

10. The method of claim 1, wherein forming the first colloidal ink solution comprises a storage modulus between 5 and 500 cP.

11. The method of claim 1, wherein forming the second colloidal ink solution comprises a storage modulus between 5 and 500 cP.

12. The method of claim 1, wherein sintering the 3D structure includes curing the 3D structure at a temperature between 40 and 250° C.

13. The method of claim 1, wherein fabricating the multi-material composite structure comprises a density between 0.8 and 1.5 g/cm$^3$.

14. The method of claim 1, wherein fabricating the multi-material composite structure further comprises a copper-graphene composite structure.

15. The method of claim 1, wherein sintering the 3D structure to form the multi-material composite structure comprises fabricating sintering the copper-iron composite structure until a copper-iron interface has a hardness of 110 HV.

16. The method of claim 14, wherein sintering the 3D structure to form the multi-material composite structure comprises sintering the copper-graphene composite structure until a copper-graphene interface has a hardness of approximately 160 HV.

\* \* \* \* \*